(12) United States Patent
Maruo et al.

(10) Patent No.: US 12,076,914 B2
(45) Date of Patent: Sep. 3, 2024

(54) MOLDING DEVICE, LIQUID COLUMN MOVING DEVICE, MOLDING METHOD, LIQUID COLUMN MOVING METHOD, AND PROGRAM

(71) Applicant: National University Corporation Yokohama National University, Yokohama (JP)

(72) Inventors: Shoji Maruo, Yokohama (JP); Hiroyuki Tadokoro, Kai (JP); Hotaka Hirata, Shioya (JP)

(73) Assignee: National University Corporation Yokohama National University, Yokohama (JP)

( * ) Notice: Subject to any disclaimer, the term of this patent is extended or adjusted under 35 U.S.C. 154(b) by 310 days.

(21) Appl. No.: 17/776,940

(22) PCT Filed: Nov. 18, 2020

(86) PCT No.: PCT/JP2020/042987
§ 371 (c)(1),
(2) Date: May 13, 2022

(87) PCT Pub. No.: WO2021/100755
PCT Pub. Date: May 27, 2021

(65) Prior Publication Data
US 2022/0396027 A1    Dec. 15, 2022

(30) Foreign Application Priority Data
Nov. 18, 2019    (JP) .................................. 2019-208227

(51) Int. Cl.
*B29C 64/124*    (2017.01)
*B29C 64/268*    (2017.01)
(Continued)

(52) U.S. Cl.
CPC .......... *B29C 64/124* (2017.08); *B29C 64/268* (2017.08); *B29C 64/307* (2017.08);
(Continued)

(58) Field of Classification Search
CPC ... B29C 64/124; B29C 64/106; B29C 64/135; B33Y 30/00
See application file for complete search history.

(56) References Cited

U.S. PATENT DOCUMENTS

| | | | |
|---|---|---|---|
| 6,400,885 B1 | 6/2002 | Hu et al. | |
| 2018/0186066 A1* | 7/2018 | Cooper | B29C 64/135 |

FOREIGN PATENT DOCUMENTS

| | | |
|---|---|---|
| JP | 2017-504016 A | 2/2017 |
| WO | WO 2015/097019 A2 | 7/2015 |
| WO | WO 2019/156170 A1 | 8/2019 |

OTHER PUBLICATIONS

Y-Y. Cao et al., "3D Metallic Nanostructure Fabrication by Surfactant-Assisted Multiphoton-Induced Reduction." Small, vol. 5, No. 10, pp. 1144-1148, 2009.
(Continued)

*Primary Examiner* — Nahida Sultana
*Assistant Examiner* — Mohamed K Ahmed Ali
(74) *Attorney, Agent, or Firm* — Blank Rome LLP

(57) ABSTRACT

A molding device includes a movement processing unit configured to move a liquid column sandwiched between two substrates and a molding unit configured to perform a molding process by partially changing the liquid column to a solid within a prescribed molding region.

5 Claims, 15 Drawing Sheets

(51) Int. Cl.
    *B29C 64/307*     (2017.01)
    *B29C 64/393*     (2017.01)
    *B33Y 10/00*     (2015.01)
    *B33Y 30/00*     (2015.01)
    *B33Y 50/02*     (2015.01)
    *B33Y 70/00*     (2020.01)

(52) U.S. Cl.
    CPC ............. *B29C 64/393* (2017.08); *B33Y 10/00* (2014.12); *B33Y 30/00* (2014.12); *B33Y 50/02* (2014.12); *B33Y 70/00* (2014.12)

(56) References Cited

OTHER PUBLICATIONS

T. Zandrini et al., "Magnetically Driven Micromachines Created by Two-Photon Microfabrication and Selective Electroless Magnetite Plating for Lab-on-a-Chip Applications." Micromachines, vol. 8, No. 35, pp. 1-8, 2017.
F. Mayer et al., "Multimaterial 3D Laser Microprinting Using an Integrated Microfluidic System." Sci. Adv., vol. 5, No. 2, pp. 1-7, 2019.
International Search Report for International Application No. PCT/JP2020/042987, mailed Jan. 19, 2021.
Supplementary Search Report, EP 20888750.5, dated Nov. 27, 2023.

\* cited by examiner

MOLDING DEVICE, LIQUID COLUMN MOVING DEVICE, MOLDING METHOD, LIQUID COLUMN MOVING METHOD, AND PROGRAM

TECHNICAL FIELD

The present invention relates to a molding device, a liquid column moving device, a molding method, a liquid column moving method, and a program.

Priority is claimed on Japanese Patent Application No. 2019-208227, filed Nov. 18, 2019, the content of which is incorporated herein by reference.

BACKGROUND ART

Stereolithography is one of the methods of molding a three-dimensional target object. In stereolithography, a target object is molded by applying light such as ultraviolet laser light to a liquid material and partially changing the material to a solid.

In relation to stereolithography, in Y Cao et al., "3D Metallic Nanostructure Fabrication by Surfactant-Assisted Multiphoton-Induced Reduction", Small, 2009, Vol. 5, No. 10, pp. 1144-1148, a method of molding a fine structure of silver in a photoreduction process is described. In the method described in this article, silver is condensed in a desired shape by irradiating laser light to an aqueous solution containing silver ions and then the aqueous solution is removed.

Also, in T. Zandrini et al., "Magnetically Driven Micromachines Created by Two-Photon Microfabrication and Selective Electroless Magnetite Plating for Lab-on-a-Chip Applications", Micromachines, 2017, Volume 8, No. 35, pp. 1-8, an experimental example in which stereolithography is performed by combining a plurality of materials is shown. In the experimental example described in this article, an acrylic resin and a methacrylic resin are respectively molded by photopolymerization and then a magnetic substance is electroless plated. As a result, only the acrylic resin between the acrylic resin and the methacrylic resin is selectively plated.

Also, in F. Mayer et al., "Multimaterial 3D laser microprinting using an integrated microfluidic system", Science Advances, February 2019, Volume 5, No. 2, pp. 1-7, a method in which an acrylic resin or the like is introduced into a molding unit using a micro-flow path, a material is switched by a valve and a molding process is performed with a plurality of resin materials is used.

In this way, it is possible to mold a target object having various characteristics by performing stereolithography using a plurality of types of materials.

SUMMARY OF THE INVENTION

Problem to be Solved by the Invention

For example, in a part of a micro-stereolithography method such as the two-photon micro-stereolithography method, a plurality of types of resins (photocurable resins) are used to generate an object of an integral structure.

As one of the methods using a plurality of types of resins, there is a method of temporarily removing a glass substrate from a molding device and cleaning the glass substrate when the resin to be used is replaced. For example, an operator performs a molding process by dropping a first resin onto the glass substrate using a molding device and focusing and scanning a laser such as a near-infrared pulse laser inside resin droplets to cure the resin. When the molding process using the first resin is completed, the operator removes the glass substrate from the molding device and cleans the uncured resin. The operator sets the glass substrate in the molding device again, drops a new second resin using the molding device, and resumes the molding process.

However, in this method, when the removed glass substrate is re-installed in the molding device, it is necessary to determine a position of the molded object made of the first resin with high accuracy. If the position of the molded object deviates from a prescribed position, for example, such as the position of the molded object before the glass substrate is removed, a desired object cannot be produced.

On the other hand, for example, as in the micro-flow path described in F. Mayer et al., "Multimaterial 3D laser microprinting using an integrated microfluidic system", Science Advances, February 2019, Volume 5, No. 2, pp. 1-7, a case where a molding process is performed by providing a flow path on a substrate and switching a resin without the need to remove a glass substrate by introducing the resin into the molding unit in order is conceivable. For the uncured resin after the molding process, a process of providing a valve for disposal under the molding unit and opening the valve to discharge an uncured resin from the molding unit is conceivable.

However, in this method, if the viscosity of the resin is high, the movement of the resin is considered to be difficult. Also, in this method, because the uncured resin is discarded every time the resin is replaced, the uncured resin cannot be reused after the molding process even if the same type of resin is repeatedly used.

An objective of the present invention is to provide a molding device, a liquid column moving device, a molding method, a liquid column moving method, and a program capable of efficiently using materials.

Solution to the Problem

According to a first aspect of the present invention, there is provided a molding device including: a movement processing unit configured to move a liquid column sandwiched between two substrates; and a molding unit configured to perform a molding process by partially changing the liquid column to a solid within a prescribed molding region.

Magnetic particles may be mixed into the liquid column.

The movement processing unit may move the liquid column by moving a magnetic substance.

The movement processing unit may move the liquid column by creating a temperature gradient in the liquid column with a point heater using electromagnetic waves.

The molding device may further include a substrate control unit configured to perform a control process so that the two substrates are separate from each other in a state in which the liquid column is sandwiched between the substrates.

According to a second aspect of the present invention, there is provided a molding device including: a movement processing unit configured to move magnetic droplets by moving a magnetic substance; and a molding unit configured to perform a molding process by partially changing the droplets to a solid within a prescribed molding region.

According to a third aspect of the present invention, there is provided a liquid column moving device including: a movement processing unit configured to move a magnetic liquid column sandwiched between two substrates by moving a magnetic substance.

According to a fourth aspect of the present invention, there is provided a liquid column moving device including: a movement processing unit configured to move magnetic droplets by moving a magnetic substance.

According to a fifth aspect of the present invention, there is provided a molding method including: moving a liquid column sandwiched between two substrates; and performing a molding process by partially changing the liquid column to a solid within a prescribed molding region.

According to a sixth aspect of the present invention, there is provided a molding method including: moving magnetic droplets by moving a magnetic substance; and performing a molding process by partially changing the droplets to a solid within a prescribed molding region.

According to a seventh aspect of the present invention, there is provided a liquid column moving method including: moving a magnetic liquid column sandwiched between two substrates by moving a magnetic substance.

According to an eighth aspect of the present invention, there is provided a liquid column moving method including: moving magnetic droplets by moving a magnetic substance.

According to a ninth aspect of the present invention, there is provided a program for causing a computer to: move a liquid column sandwiched between two substrates; and perform a molding process by partially changing the liquid column to a solid within a prescribed molding region.

According to a tenth aspect of the present invention, there is provided a program for causing a computer to: move magnetic droplets by moving a magnetic substance; and perform a molding process by partially changing the droplets to a solid within a prescribed molding region.

According to an eleventh aspect of the present invention, there is provided a program for causing a computer to: move a magnetic liquid column sandwiched between two substrates by moving a magnetic substance.

According to a twelfth aspect of the present invention, there is provided a program for causing a computer to: move magnetic droplets by moving a magnetic substance.

Advantageous Effects of Invention

According to an embodiment of the present invention, it is possible to efficiently use materials.

DETAILED DESCRIPTION OF THE EMBODIMENTS

Embodiments of the present invention will now be described. However, the following embodiments do not restrict the invention claimed in the claims. Also, all combinations of features described in the embodiments are not necessarily mandatory for the problem-solving means of the invention.

First Embodiment

Configuration of Molding System

Figure 1:
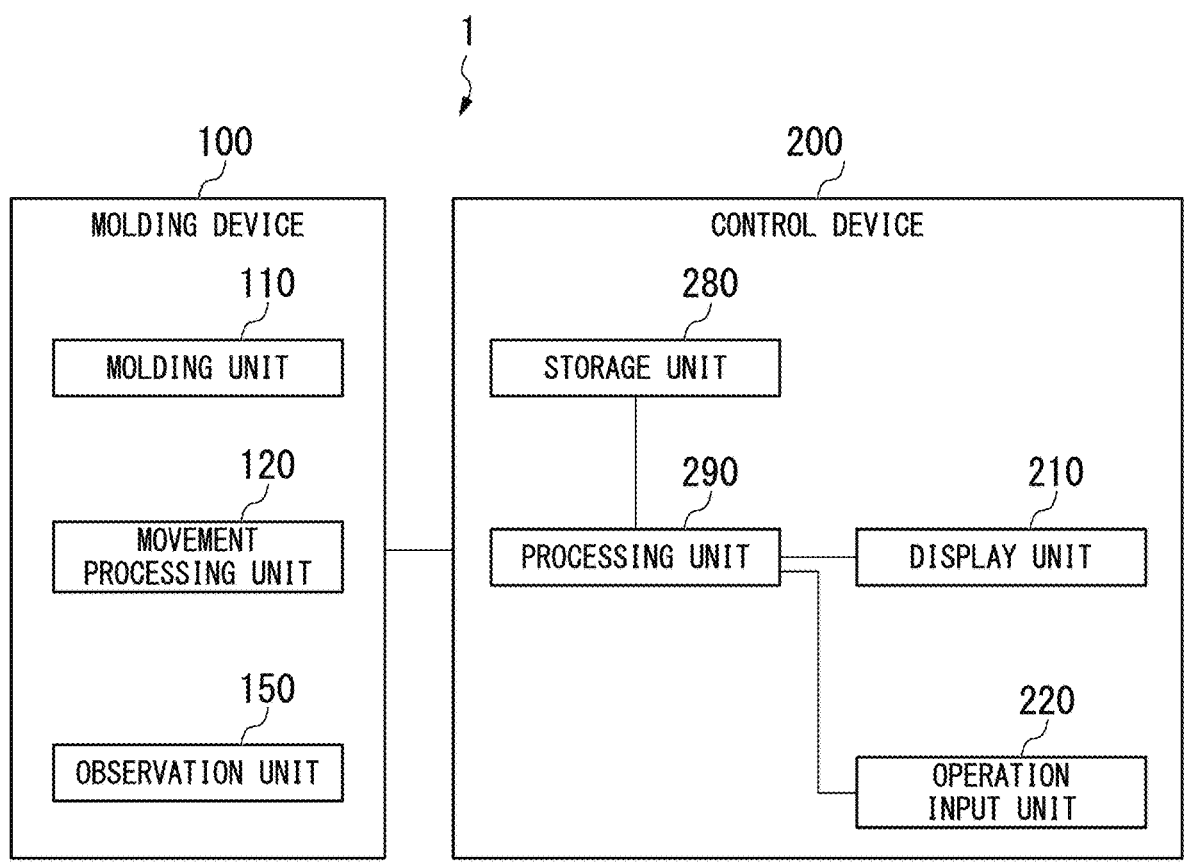
FIG. 1 is a diagram showing an example of a configuration of a molding system according to a first embodiment.

FIG. 1 is a diagram showing an example of a configuration of a molding system according to a first embodiment. In the configuration shown in FIG. 1, a molding system 1 includes a molding device 100 and a control device 200. The molding device 100 includes a molding unit 110, a movement processing unit 120, and an observation unit 150. The control device 200 includes a display unit 210, an operation input unit 220, a storage unit 280, and a processing unit 290.

The molding system 1 generates a target object by partially changing a liquid column to a solid. An example of a liquid column is one in which a liquid is sandwiched between two substrates to have a column shape. Also, the liquid column has magnetism. For example, a mixture in which iron powder is mixed into a liquid having no magnetism may have the shape of a liquid column. The iron powder corresponds to an example of magnetic particles.

The molding device 100 is a device that executes a process of generating a target object in accordance with a control process of the control device 200. In particular, the molding device 100 molds the target object by partially changing the liquid column of each of the one or more materials to a solid. The molding mentioned here is to make something with a shape.

The molding unit 110 performs a molding process by partially changing the liquid column to a solid within a molding region. Specifically, a part of the liquid column is changed to a solid at a position of a focal point of laser light by irradiating the laser light to the liquid column and forming the focal point of the laser light within the liquid column. The molding region mentioned here is a region where the molding unit 110 can change a material to a solid. Specifically, the molding region is a region where the molding unit 110 can form a focal point of the laser light.

The laser light is also simply referred to as a laser.

Hereinafter, a case where the material forming the liquid column is a photocurable resin and the molding unit 110 cures the photocurable resin from a liquid to a solid according to stereolithography will be described as an example.

However, it is only necessary for a method in which the molding unit 110 performs a molding process to be a method of partially changing the liquid column to a solid. The method is not limited to a specific method. For example, the method in which the molding unit 110 performs the molding process may be one of photopolymerization, photocrosslinking, photoreduction, and photo-induced aggregation or a combination thereof.

Also, the laser light used for molding may be any laser light that can cure the material and is not limited to laser light having a specific wavelength. For example, the molding unit 110 may use ultraviolet laser light or blue laser light. Alternatively, the molding unit 110 may be configured to perform the molding process in a two-photon molding method using two-photon absorption using near-infrared femtosecond-pulse laser light.

Figure 2:
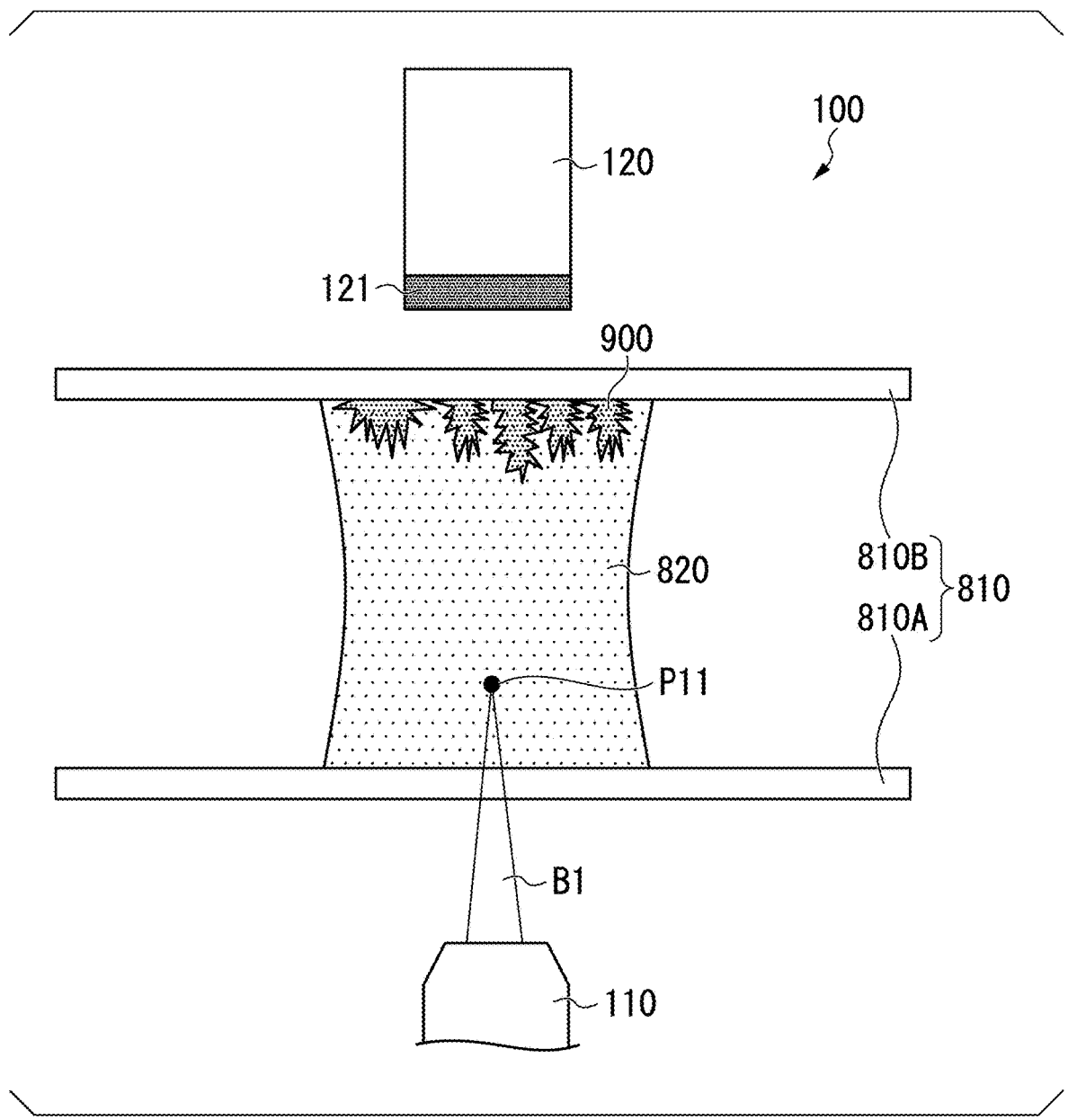
FIG. 2 is a diagram showing an example of a position where a molding unit forms a focal point of laser light according to the first embodiment.

FIG. 2 is a diagram showing an example of a position where the molding unit 110 forms a focal point of the laser light. In FIG. 2, a laser light-emitting portion of the molding unit 110 is shown. A substrate 810 is a glass plate used as a substrate for molding a target object. The molding device 100 includes a substrate 810A and a substrate 810B as the substrate 810. The substrate 810A and the substrate 810B sandwich a liquid column 820. The laser light irradiated by the molding unit 110 is also referred to as a molding beam B1.

The substrate 810 may be configured as a part of the molding device 100 or may be configured as an object separate from the molding device 100.

FIG. 2 shows an example in which the molding unit 110, the movement processing unit 120, the substrate 810, and the liquid column 820 are viewed from the side (a horizontal direction). The movement processing unit 120 includes a magnetic substance 121. Examples of the magnetic substance 121 include a permanent magnet, an electromagnet, a neodymium magnet, and the like. When a magnetic substance is described, it is also simply referred to as a magnet.

The molding unit 110 shown in FIG. 2 irradiates the molding beam B1 to the liquid column 820 through which the molding beam B1 is transmitted from below the substrate 810A so that a focal point of the molding beam B1 is formed inside of the liquid column 820. The focal point of the molding beam B1 irradiated by the molding unit 110 is formed at a point P11. Thereby, a part of the liquid column 820 at the point P11 changes from a liquid to a solid.

The laser light-emitting portion of the molding unit 110 can move forward, backward, left, and right in FIG. 2. The forward, backward, left, and right directions in FIG. 2 may be a horizontal direction. Also, the molding unit 110 can move a position of the focal point of the molding beam B1 upward and downward in FIG. 2. The upward and downward directions in FIG. 2 may be a vertical direction. Therefore, the molding unit 110 can three-dimensionally move the position of the focal point of the molding beam B1 upward, downward, left, right, forward, and backward in FIG. 2.

The molding unit 110 can process a material in a shape of a target object by moving the position of the focal point of the molding beam B1 within the liquid column 820 along the shape of the target object.

In addition to or instead of moving the laser light-emitting portion, the molding unit 110 may use a Galvano mirror to change the position of the focal point of the molding beam B1. Furthermore, in addition to or instead of the above-described method, the molding unit 110 may be configured so that the position of the focal point of the molding beam B1 in the liquid column 820 is changed in a process of moving the substrate 810, a process of moving a lens for condensing the laser light in an optical axis direction, or a combination thereof.

Also, as shown in FIG. 2, the molding unit 110 irradiates the molding beam B1 from below the substrate 810, so that a position where the focal point of the molding beam B1 is formed is not affected by refraction according to a shape of the liquid column 820 due to surface tension. In this regard, the molding system 1 can align the focal point of the molding beam B1 with high accuracy.

The iron powder 900 is mixed into the liquid column 820 and is moved to a position close to the magnetic substance 121 due to a magnetic force of the magnetic substance 121. Also, in the example shown in FIG. 2, a plurality of pieces of iron powder 900 are gathered to form a lump due to the magnetism of the magnetic substance 121. In relation to a size and a shape of the iron powder 900, the iron powder 900 having any size and shape can be used in accordance with a size and a shape of the object to be molded using the molding system 1. Also, in relation to an amount of the iron powder 900, any amount of the iron powder 900 can be used in accordance with surface tension and a viscous frictional force of the liquid constituting the liquid column 820 and the like.

Although the molding unit 110 is located below the substrate 810A and the movement processing unit 120 is located above the substrate 810B in the example of FIG. 2, the present invention is not limited to this positional relationship. For example, the molding unit 110 may be configured to be located above the substrate 810B and the movement processing unit 120 may be configured to be located below the substrate 810A.

Also, the molding unit 110 and the movement processing unit 120 may be configured to be provided under the substrate 810A. In this case, the molding unit 110 and the movement processing unit 120 may be configured to be provided at distant positions so that the molding beam B1 does not hit the iron powder 900.

Alternatively, the molding unit 110 and the movement processing unit 120 may be configured to be provided on the substrate 810B. Even in this case, the molding unit 110 and the movement processing unit 120 may be configured to be provided at separate positions so that the molding beam B1 does not hit the iron powder 900.

Figure 3:
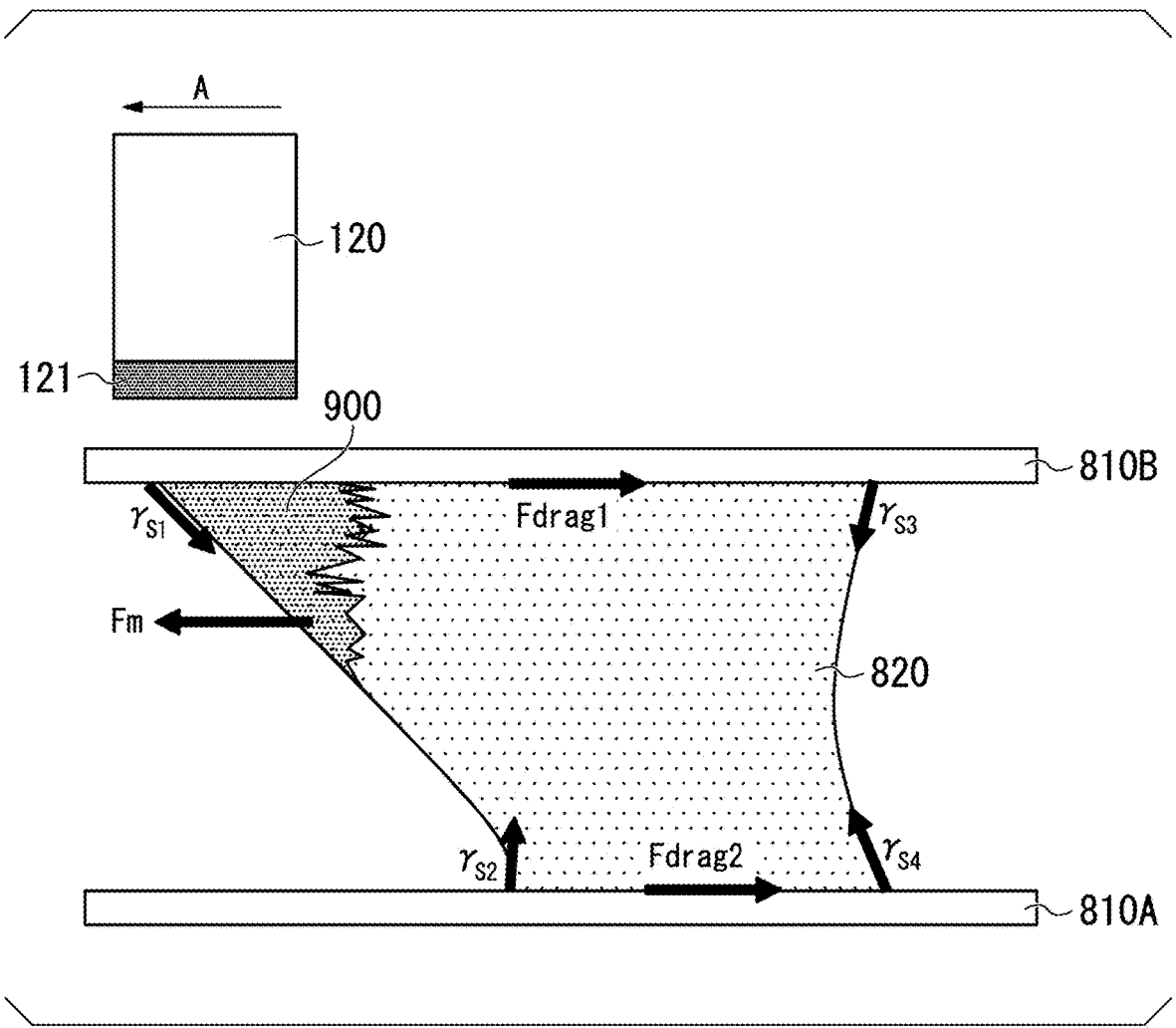
FIG. 3 is a diagram showing an example of magnetic drive of a liquid column according to the first embodiment.

FIG. 3 is a diagram showing an example of magnetic drive of the liquid column 820.

In the example shown in FIG. 3, the iron powder 900 is mixed into the resin liquid column 820 sandwiched between the substrate 810A and the substrate 810B. When the movement processing unit 120 brings the magnetic substance 121 close to the liquid column 820, the iron powder 900 inside of the liquid column 820 becomes magnetic and is attracted to the magnetic substance 121.

When the movement processing unit 120 moves the magnetic substance 121 in an A-direction, the iron powder 900 pushes out a side surface of the liquid column 820 and pulls the entire liquid column 820 with a force $F_m$ as shown in FIG. 3. When the force $F_m$ becomes larger than a resultant force of viscous friction forces $F_{drag1}$ and $F_{drag2}$ of the liquid column 820 and surface tensions $\gamma_{s1}$, $\gamma_{s2}$, $\gamma_{s3}$, and $\gamma_{s4}$, the liquid column 820 moves in a movement direction of the magnetic substance 121. That is, when $F_m$ is larger than a resultant force of $F_{drag1}$, $F_{drag2}$, $\gamma_{s1}$, $\gamma_{s2}$, $\gamma_{s3}$, and $\gamma_{s4}$, the liquid column 820 moves in the A-direction, which is the same as the direction of $F_m$. By using the driving principle as described above, the molding system 1 can operate the magnetic substance 121 to move the liquid column 820, for example, in the horizontal direction.

Figure 4:
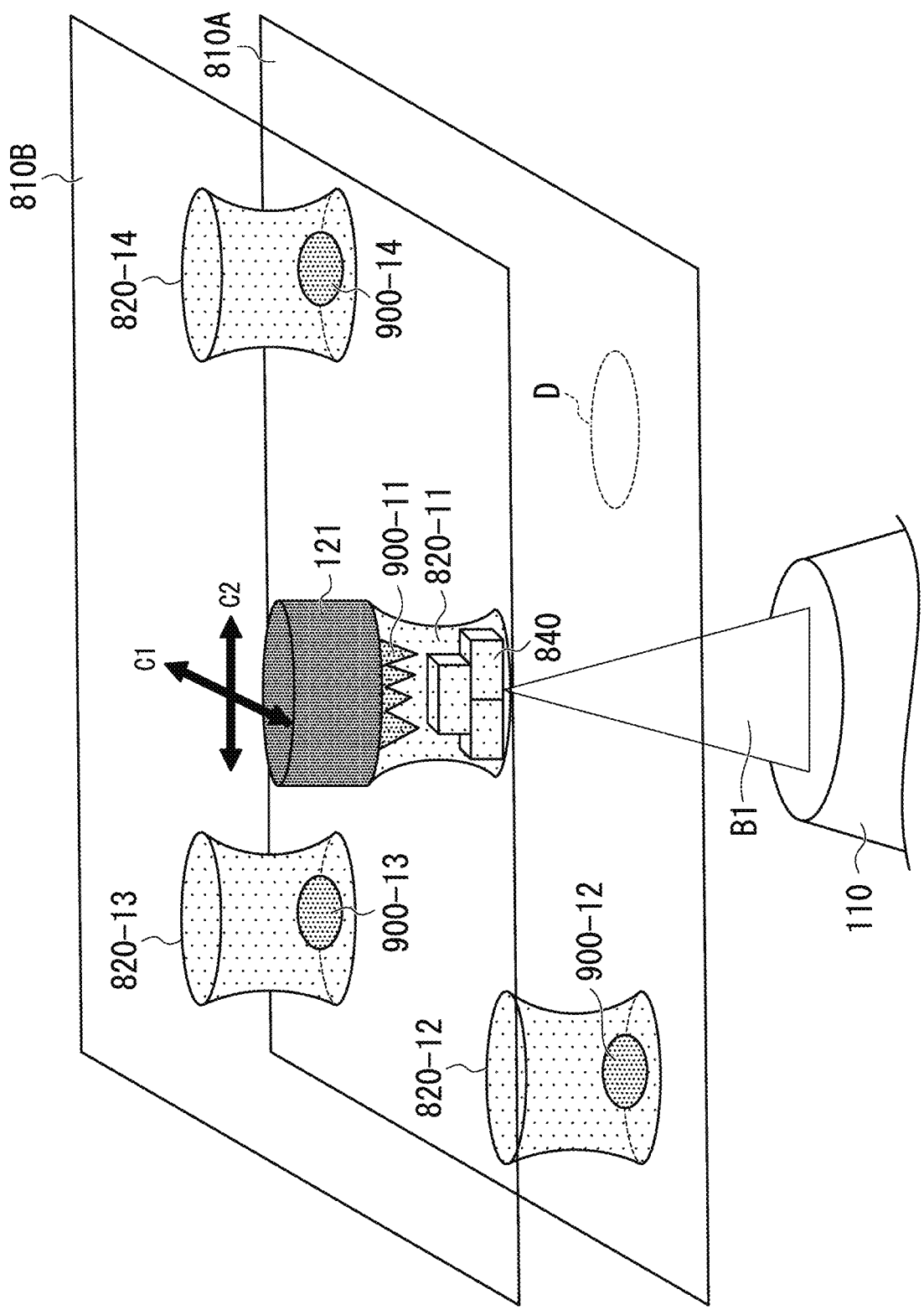
FIG. 4 is a diagram showing an example of a positional relationship between a laser light-emitting portion of the molding unit and the liquid column according to the first embodiment.

FIG. 4 is a diagram showing an example of a positional relationship between the laser light-emitting portion of the molding unit 110 and the liquid column 820. FIG. 4 shows an example in which the laser light-emitting portion of the molding unit 110 is viewed from diagonally above.

In the example of FIG. 4, the substrate 810A is located on the laser light-emitting portion of the molding unit 110 and four liquid columns 820 made of different materials are sandwiched between the substrate 810A and the substrate 810B.

Here, the four liquid columns 820 are a liquid column 820-11 of a first material, a liquid column 820-12 of a second material, a liquid column 820-13 of a third material, and a liquid column 820-14 of a fourth material. The first material, the second material, the third material, and the fourth material may be materials having the same component or may be materials having different components.

In the example shown in FIG. 4, the liquid column 820-11 of the first material, the liquid column 820-13 of the third material, and the liquid column 820-14 of the fourth material are the liquid columns 820 of photocurable resins and the liquid column 820-12 of the second material is a cleaning liquid. This cleaning liquid contains a component capable of cleaning the substrate 810A and the substrate 810B.

Iron powder 900-11 is mixed into the liquid column 820-11 and iron powder 900-12 is mixed into the liquid column 820-12. Also, iron powder 900-13 is mixed into the liquid column 820-13 and iron powder 900-14 is mixed into the liquid column 820-14.

In the state shown in FIG. 4, the iron powder 900-12, the iron powder 900-13, and the iron powder 900-14 are all present at positions far from the magnetic substance 121 and the influence of the magnetic force of the magnetic substance 121 is small. Thereby, all of the iron powder 900-12, the iron powder 900-13, and the iron powder 900-14 are settled below the liquid column 820 (on or near the bottom surface thereof) due to gravity.

On the other hand, the iron powder 900-11 is affected by the magnetic force of the magnetic substance 121 and is moved toward the magnetic substance 121.

The magnetic substance 121 moves the iron powder 900 with a magnetic force by moving in a direction C1, a direction C2, or a combination direction thereof. The magnetic substance 121 moves the liquid column 820 in which the iron powder 900 is mixed by moving the iron powder 900.

The liquid column 820-11 of the first material among the liquid columns 820 is located above the laser light-emitting portion of the molding unit 110. The molding unit 110 irradiates the molding beam B1 whose focal point is formed inside of the liquid column 820-11 of the first material, so that a focal point part of the liquid column 820-11 changes from a liquid to a solid and a solid object 840 is generated.

Next, an example of an operation of the molding system 1 will be described.

The molding system 1 uses the magnetic substance 121 to move the liquid column 820-11 from a position D to the position above the molding unit 110, which is a molding region. The molding system 1 changes a part of the liquid column 820-11 from a liquid to a solid in the molding region and molds the solid object 840 which is a part of a three-dimensional model.

The molding system 1 moves the magnetic substance 121 from the position D to the position above the molding unit 110, so that the iron powder 900-11 mixed into the liquid column 820-11 is moved from the position D to the position above the molding unit 110 by the magnetic force of the magnetic substance 121. As the iron powder 900-11 moves from the position D to the position above the molding unit 110, the liquid column 820-11 into which the iron powder 900-11 is mixed is also pulled by the iron powder 900-11 and moved from the position D to the position above the molding unit 110.

After the solid object 840 is molded, the molding system 1 moves the remaining uncured liquid column 820-11 from the position above the molding unit 110, which is the molding region, to the position D using the magnetic substance 121. Next, the molding system 1 moves the liquid column 820-12 of the cleaning liquid to the position above the molding unit 110, which is the molding region, using the magnetic substance 121. According to the movement of the cleaning liquid, the molding system 1 cleans the liquid resin remaining in the solid object 840. Because the iron powder 900-12 is also mixed into the liquid column 820-12, the molding system 1 can be moved using the magnetic substance 121 as in the case of the liquid column 820-11.

After the solid object 840 is cleaned in the above-described process, the molding system 1 moves the liquid column 820-12 of the cleaning liquid to another place using the magnetic substance 121. For example, the molding system 1 moves the liquid column 820-12 of the cleaning liquid to the original position shown in FIG. 4.

Subsequently, the molding system 1 moves the liquid column 820-13, which is a new resin, to the position above molding unit 110, which is the molding region, using the magnetic substance 121 and resumes a process of molding the solid object 840.

The molding system 1 iterates the above-described steps to integrally mold the solid object 840 of the three-dimensional model with a plurality of resins.

According to the molding system 1, the substrate 810 is removed from the molding device 100 on the way, the ineffective resin is cleaned off, it is unnecessary to execute a contact step in which a new resin is dropped and the molding process is resumed, and it is possible to replace the resin in a non-contact type. The non-contact type mentioned here indicates that a user of the molding system 1 who is an operator does not directly touch the substrate 810. Thereby, the molding system 1 can perform a multi-material molding process while reusing the uncured resin without the solid object 840, which is a molded object, being displaced.

When the molding system 1 uses the two-photon molding method described above, the solid object 840, which is a molded object, needs to stay in the molding region of the substrate 810. On the other hand, as shown in FIG. 4, when the molding system 1 uses a plurality of liquid columns 820, the liquid columns 820 are required not to remain in the molding region of the substrate 810 so that mixing of the plurality of liquid columns 820 is prevented.

Therefore, the surface treatment in which the solid object 840 stays in the molding region and the liquid column 820 moves without remaining in the molding region of the substrate 810 may be performed with respect to the substrate 810. In this case, a plurality of types of surface treatments may be used separately in accordance with the position on the surface of the substrate 810. For example, in the vicinity of the center of the surface of the substrate 810A, the surface near the region where the solid object 840 is formed by irradiating a laser may be subjected to a methacrylate group-related treatment having high adhesiveness to the photocurable resin which is the material of the liquid column 820. On the other hand, the other regions within the surface of the substrate 810A and the surface of the substrate 810B for moving the liquid column 820 using the magnetic substance 121 are subjected to a fluorine coating treatment having low adhesiveness to the photocurable resin. By performing the surface treatment in this way, it is possible to achieve both adhesion between the solid object 840 and the substrate 810 and movement of the liquid column 820.

The observation unit 150 captures an image of the target object.

Figure 5:
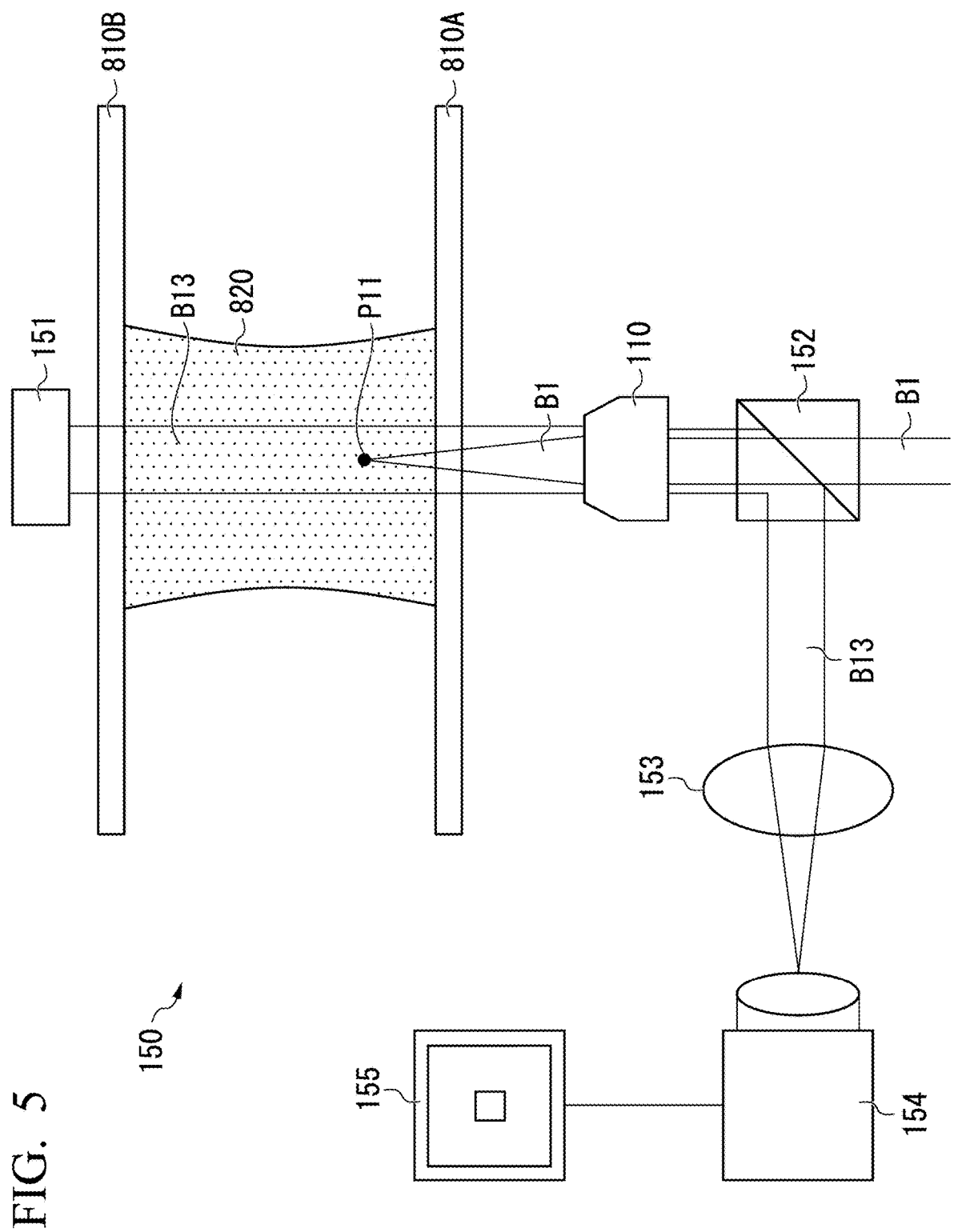
FIG. 5 is a diagram showing an example of a configuration of an observation unit according to the first embodiment.

FIG. 5 is a diagram showing an example of a configuration of the observation unit 150. In the example of FIG. 5, the observation unit 150 includes an observation light source 151, a beam splitter 152, an observation lens 153, a CCD camera 154, and a display device 155.

The observation light source 151 irradiates illumination light B13 for photographing the target object. The target object here may be an intermediate object during the molding process. The illumination light B13 is irradiated to the target object. After a part of the illumination light B13 is reflected or absorbed, the remaining light is incident on the beam splitter 152 via the laser light-emitting portion of the molding unit 110.

In the example of FIG. 5, the observation light source 151 is located above the molding region.

The beam splitter 152 includes a half mirror and causes the illumination light B13 to be reflected. The beam splitter 152 receives not only the incidence of the illumination light B13 but also the incidence of the molding beam B1. The beam splitter 152 causes the molding beam B1 to pass through and causes the molding beam B1 to move toward the laser light-emitting portion of the molding unit 110. Due to the reflection of the illumination light B13, the beam splitter 152 switches a direction of the illumination light B13, which has passed through the same path as the molding beam B1 in a direction opposite to that of the molding beam B1, to a direction different from the direction of the path of the molding beam B1.

The observation lens 153 refracts the illumination light B13 so that the illumination light B13 forms an image at a position of a photography element of the CCD camera 154.

The CCD camera 154 receives the illumination light B13 and performs photoelectric conversion to generate image data of the target object.

The display device 155 has a display screen such as, for example, a liquid crystal panel or an LED panel, and displays an image of a target object. Specifically, the display device 155 receives the input of the image data of the target object generated by the CCD camera, and displays an image indicated by the image data.

However, a configuration and an arrangement of the observation unit 150 is not limited to those shown in FIG. 5. For example, the observation unit 150 may be configured to photograph the target object from an upward direction or may be configured to photograph the target object from a diagonally upward direction or a diagonally downward direction.

The control device 200 controls the molding device 100 so that the target object is generated. For example, the control device 200 controls a timing at which the molding unit 110 irradiates the molding beam B1 and a position of a focal point of the molding beam B1. Also, the control device 200 controls a position of the magnetic substance 121 provided in the movement processing unit 120 by controlling the position of the movement processing unit 120.

Also, the control device 200 functions as a user interface of the molding system 1. The control device 200 is configured using a computer such as, for example, a personal computer or a workstation.

The display unit 210 has a display screen such as, for example, a liquid crystal panel or an LED panel, and displays various types of images. In particular, the display unit 210 presents information about the molding system 1 to the user.

The display unit 210 may be configured using the display device 155 or may be configured separately from the display device 155.

The operation input unit 220 includes input devices such as a keyboard and a mouse, and receives an operation of the user. In particular, the operation input unit 220 receives an operation of the user for performing a setting process associated with the molding system 1.

The storage unit 280 stores various types of data. The storage unit 280 is configured using a storage device provided in the control device 200.

The processing unit 290 controls parts of the control device 200 so that the parts execute various types of processes. A function of the processing unit 290 is executed by a central processing unit (CPU) provided in the control device 200 reading a program from the storage unit 280 and executing the program.

The control device 200 may be configured to automatically control the molding device 100 on the basis of a preset program or the like. Alternatively, the user may input an instruction to the control device 200 online and the control device 200 may be configured to control the molding device 100 in accordance with an instruction of the user.

Although the iron powder 900 is not shown in FIG. 5, the iron powder 900 is mixed into the liquid column 820.

The division of processing for controlling the parts of the molding device 100 between the molding device 100 and the control device 200 is not limited to a specific one. For example, the control device 200 may be configured to control all the parts of the molding device 100. Alternatively, the molding device 100 and the control device 200 may jointly control each part of the molding device 100. For example, the molding device 100 itself may be configured to perform a lower-order control process among processes of controlling each part of the molding device 100 and the control device 200 may be configured to perform a higher-order control process. Alternatively, a configuration in which the molding device 100 itself controls each part of the molding device 100 such as a configuration in which molding device 100 and the control device 200 are integrated may be adopted.

Next, the operation of the molding system 1 will be described with reference to FIG. 6.

Figure 6:
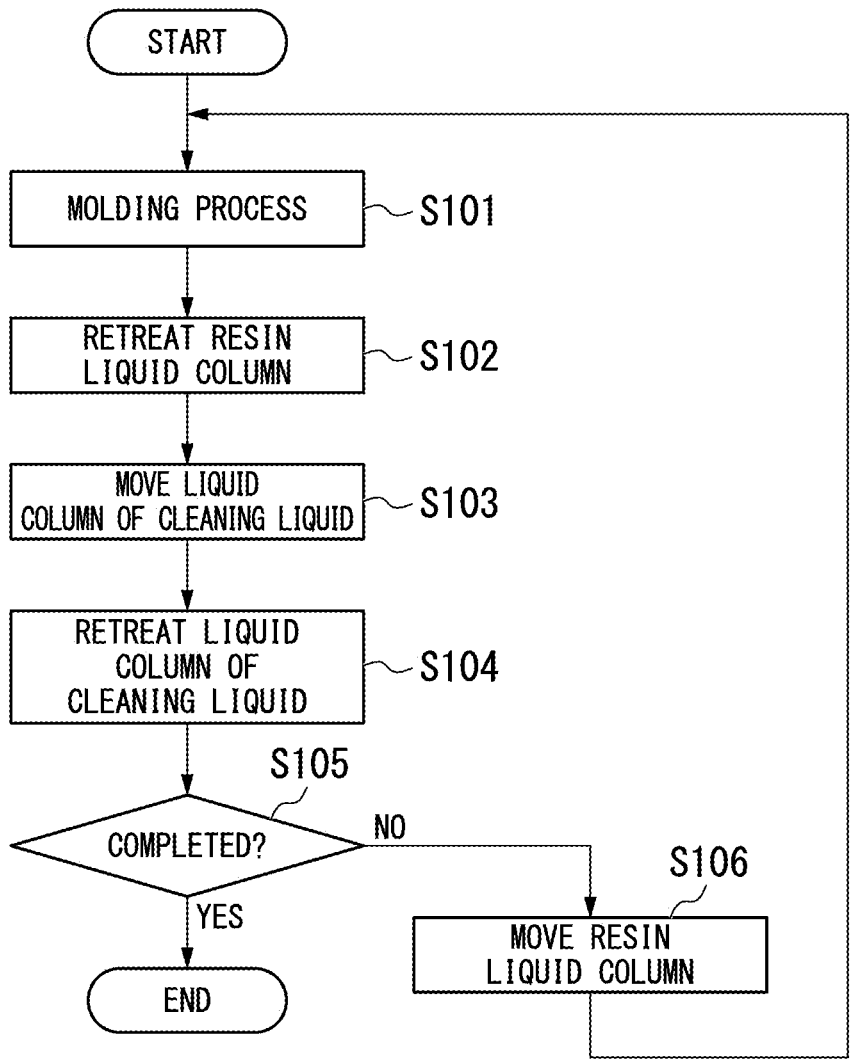
FIG. 6 is a flowchart showing an example of an operation of the molding system according to the first embodiment.

FIG. 6 is a flowchart showing an operation example of the molding system 1. FIG. 6 shows an example of a processing procedure in which the control device 200 controls the molding device 100 so that a target object is generated.

In the process of FIG. 6, the control device 200 controls the molding unit 110 so that a molding process is performed (step S101). The molding unit 110 forms a focal point of a molding beam B1 within the liquid column 820 of a resin by irradiating the molding beam B1 to the liquid column 820 within the molding region in accordance with a control process of the control device 200. The material changes from a liquid to a solid at a position of the focal point.

Subsequently, the control device 200 controls the movement processing unit 120 so that the liquid column 820 of the resin is retreated to the outside of a molding region (a retreat region) (step S102). The movement processing unit 120 moves the liquid column 820 within the molding region to the outside of the molding region in accordance with the control process of the control device 200.

Subsequently, the control device 200 controls the movement processing unit 120 so that the liquid column 820 of the cleaning liquid is moved (step S103). Thereby, the molding system 1 cleans the solid object 840 in the molding region.

Subsequently, the control device 200 controls the movement processing unit 120 so that the liquid column 820 of the cleaning liquid is retreated (step S104).

Subsequently, the user of the molding system 1 determines whether or not a target object has been completed (step S105). When it is determined that the target object has been completed (step S105: YES), the process of FIG. 6 is ended.

On the other hand, when it is determined that the target object has not been completed (step S105: NO), the control device 200 controls the movement processing unit 120 so that the liquid column 820 of the resin to be used subsequently is moved to the molding region (step S106). The movement processing unit 120 moves the liquid column 820 of the resin to be used subsequently from the outside of the molding region to the inside of the molding region in accordance with the control process of the control device 200.

After step S106, the process returns to step S101.

The laser light-emitting portion of the molding unit 110 may be configured to change an angle at which the molding beam B1 is emitted.

Figure 7:
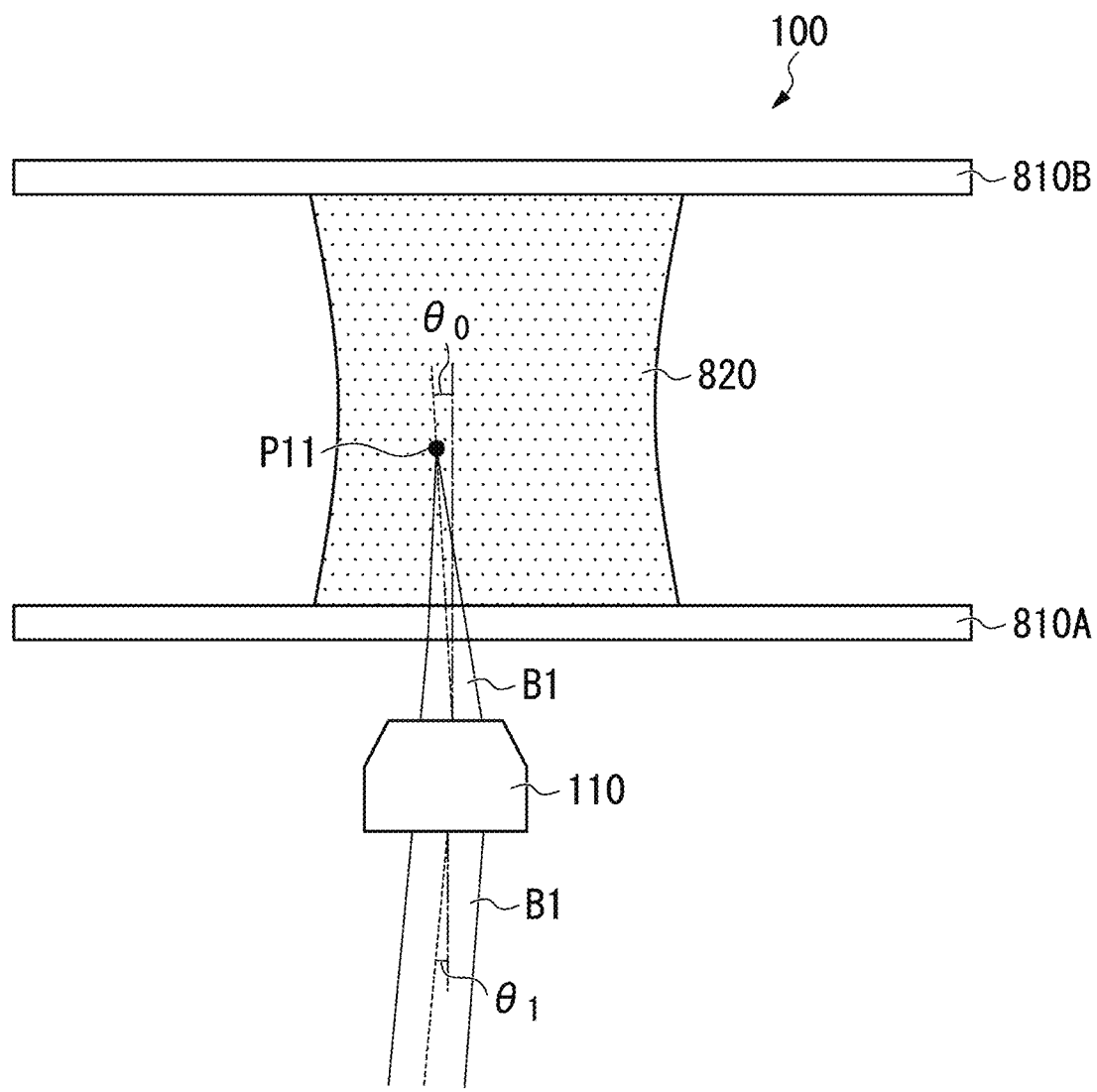
FIG. 7 is a diagram showing an example of a relationship between an angle of a molding beam and a position of a focal point thereof according to the first embodiment.

FIG. 7 shows an example of a relationship between an angle of the molding beam B1 and a position of a focal point thereof.

In the example of FIG. 7, the laser light-emitting portion of the molding unit 110 functions as an objective lens and the molding beam B1 incident from a side (the lower side of FIG. 7) opposite to the liquid column 820 is refracted and irradiated to a side (the upper side of FIG. 7) of the liquid column 820.

An angle of incidence of the molding beam B1 on the laser light-emitting portion of the molding unit 110 is denoted by $\theta_I$. An angle of emission of the molding beam B1 from the laser light-emitting portion of the molding unit 110 is denoted by $\theta_O$. The emission angle $\theta_O$ changes with the incidence angle $\theta_I$. As the emission angle $\theta_O$ changes, a position of a point P11 where the focal point of the molding beam B1 is formed also changes. Therefore, the molding unit 110 can change a position where a focal point of the molding beam B1 is formed by changing the incidence angle $\theta_I$ of the molding beam B1 to the laser light-emitting portion without the need to change either the position of the laser light-emitting portion or the position of the substrate 810.

As a method of changing the incidence angle $\theta_I$, for example, a method of providing a mirror between a light source of the molding beam B1 and the laser light-emitting portion of the molding unit 110 and changing a direction of the mirror can be used.

Next, an experimental example of a relationship between an amount of mixed iron powder 900 and a moving speed of the liquid column 820 with respect to the liquid column 820 made of different materials will be described.

Figure 8:
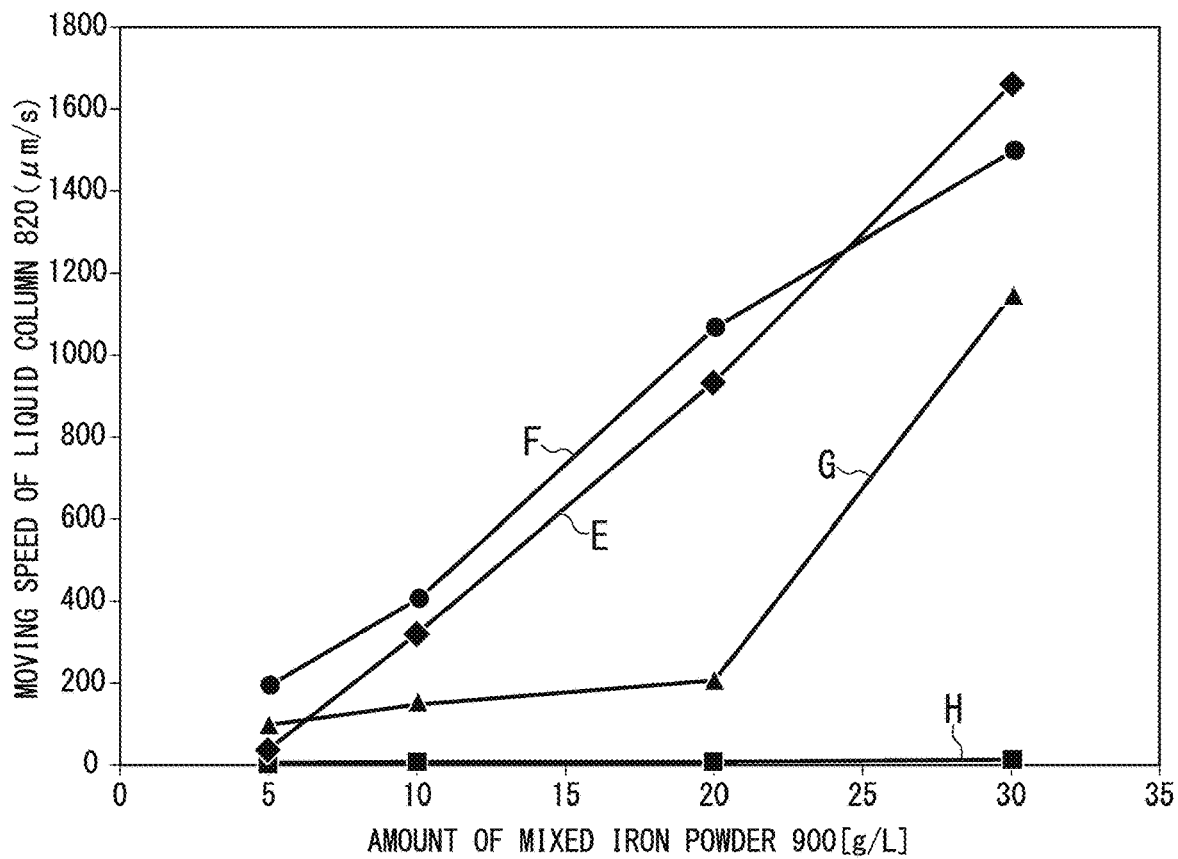
FIG. 8 is a diagram showing an experimental example of a relationship between an amount of mixed iron powder and a moving speed of the liquid column according to the first embodiment.

FIG. 8 is a diagram showing an example of the relationship between the amount of mixed iron powder 900 and the moving speed of the liquid column 820. FIG. 8 shows an experimental example of a relationship between an amount of mixed iron powder 900 and an upper limit speed at which the liquid column 820 can move with respect to the liquid column 820 made of different materials. The horizontal axis of the graph of FIG. 8 represents the amount of mixed iron powder 900. The vertical axis represents the moving speed of the liquid column 820.

In the experimental example shown in FIG. 8, the fluorine-coated cover glass was used as the substrate 810A and the substrate 810B. A volume of the liquid column 820 was 6 microliters (μL) and the distance between the substrate 810A and the substrate 810B was 1 millimeter (mm). The volume of the liquid column 820 includes the amount of iron powder 900 mixed into the liquid column 820.

The types of materials used for the liquid column 820 are pure water, ethanol, a low-viscosity photocurable resin, and a high-viscosity photocurable resin, for a total of four types.

E, F, G, and H are used as symbols representing pure water, ethanol, a low-viscosity photocurable resin, and a highly viscous photocurable resin, respectively.

Pure water E and ethanol F were used for comparison of surface tension. A low-viscosity resin G and a high-viscosity resin H were used for comparison of viscosity. Also, a neodymium magnet having a magnetic flux density of 280 millitesla (mT) was used as the magnetic substance 121.

First, a movable upper-limit speed was investigated to an extent that the iron powder 900 is not separated from the liquid column 820 with respect to each amount of iron powder 900 mixed into the liquid column 820 such as 5 grams per liter (g/L), 10 grams per liter, 20 grams per liter, or 30 grams per liter. As a result, as shown in FIG. 8, it was found that the upper limit of the movable upper speed of the liquid column 820 was increased when the amount of iron powder 900 mixed into any of the materials was increased.

Also, in relation to a difference in surface tension, ethanol F has a higher moving speed when the amount of mixed iron powder 900 is about 24 grams per liter or less and pure water E has a higher moving speed when it is greater than 24 grams per liter. A case where movement is difficult because the surface tension of pure water E is larger than that of ethanol F and surface tension $\gamma_{s1}$ (see FIG. 3) of a receding angle formed by the deformation of the liquid column 820 is larger when the amount of mixed iron powder 900 is relatively small is conceivable. On the other hand, a case where pure water E can move faster because the surface tension $\gamma_{s1}$ is smaller than the magnetic force applied to the liquid column 820 when the amount of iron powder 900 is relatively large is conceivable.

In relation to a difference in viscosity, the high-viscosity resin H has a lower moving speed than the low-viscosity resin G regardless of the amount of iron powder 900. Movement is considered to be difficult because the viscosity is high and the viscous resistance is large.

Hereinafter, an example of the solid object 840 molded using the molding system 1 will be described. An example according to FIGS. 9 and 10 to be described below is a demonstration of a multi-material molding process according to magnetic drive of the liquid column 820 using the liquid column 820 of two types of photocurable resins (an acrylate-based resin and a methacrylate-based resin) and the liquid column 820 of a cleaning liquid. The amount of resin used for movement is 6 microliters and the amount of mixed iron powder 900 is 23 grams per liter.

Figure 9:
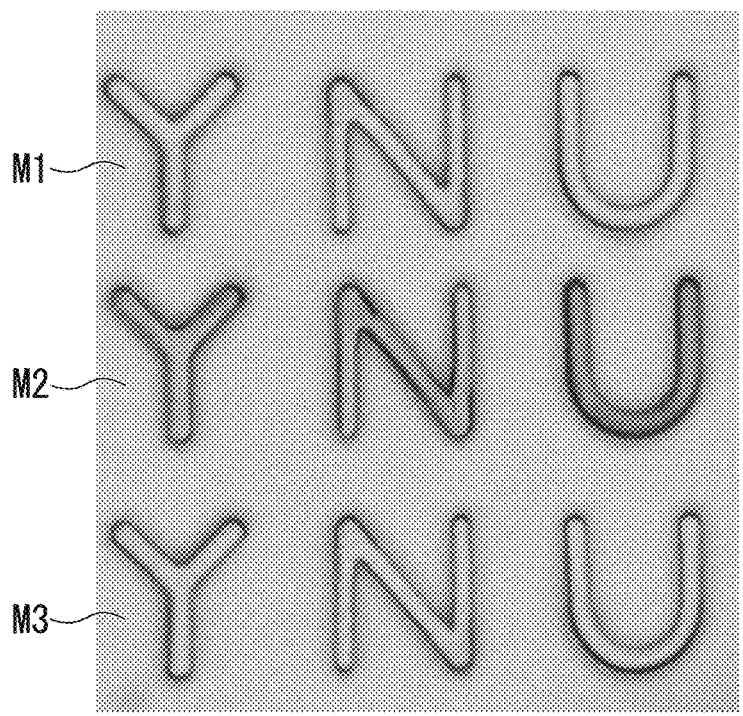
FIG. 9 is a diagram showing a first example of a solid object molded using the molding system according to the first embodiment.

FIG. 9 is a diagram showing a first example of the solid object 840 molded using the molding system 1.

In the example shown in FIG. 9, a YNU model M1 in a first row and a YNU model M3 in a third row were molded with a colorless acrylate-based resin and the YNU model M2 in the second row was molded with a methacrylate-based resin dyed in red. From this experimental result, it was demonstrated that a molding process can be performed using different resin materials within the same plane.

Figure 10:
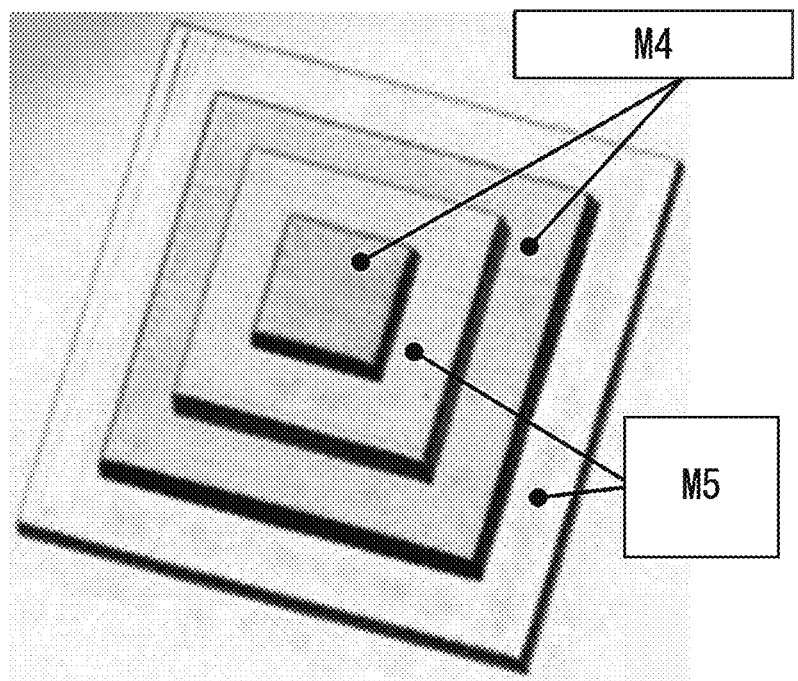
FIG. 10 is a diagram showing a second example of a solid object molded using the molding system according to the first embodiment.

FIG. 10 is a diagram showing a second example of the solid object 840 molded using the molding system 1.

In the example shown in FIG. 10, a four-stage pyramid model was molded as a three-dimensional microstructure. The resin was replaced three times and a portion M4 made of the methacrylate-based resin dyed in red and a portion M5 made of the colorless acrylate-based resin were molded by alternately replacing the resins. From this experimental result, it was demonstrated that a multi-material molding process is possible even in a 3D structure according to this method.

The molding device 100 including the movement processing unit 120 described in the above-described embodiment corresponds to an example of a liquid column moving device.

Effects in First Embodiment

The molding device 100 according to the first embodiment includes the movement processing unit 120 configured to move the liquid column 820 sandwiched between the two substrates 810 and the molding unit 110 configured to partially change the liquid column 820 to a solid within a prescribed molding region.

The molding device 100 can perform a movement process for the liquid column 820 sandwiched between the two substrates 810. Thereby, the user of the molding device 100 can easily move the liquid column 820 with a smaller position shift of a molded object, less disposal of resin, and less mixing of materials and can generate the solid object 840 using the liquid column 820 cost-effectively.

Also, magnetic particles are mixed into the liquid column 820.

Thereby, the user of the molding device 100 can move the magnetic particles mixed into the liquid column using a magnetic object and can easily move the liquid column 820. Also, because the movement is not movement due to heat, the liquid column 820 of a volatile material, the liquid column 820 of an aqueous system, and the liquid column 820 of a biopolymer can also be moved.

Also, the movement processing unit 120 moves the liquid column 820 by moving the magnetic substance 121.

Thereby, the user of the molding device 100 can easily move the liquid column 820 using the magnetic substance 121.

Second Embodiment

Configuration of Molding System

A method in which a movement processing unit 120 moves a liquid column 820 is not limited to the method using the magnetic substance 121 described above. In a second embodiment, a case where the movement processing unit 120 moves the liquid column 820 using a point heater will be described.

As described above, in the second embodiment, the method in which the movement processing unit 120 moves the liquid column 820 is different from the case of the first embodiment. Along with this, in the second embodiment, the liquid column 820 does not need to have magnetism. In the second embodiment, a case where iron powder is not mixed into the liquid column 820 will be described as an example.

In relation to others, a molding system 1 according to the second embodiment is similar to the molding system 1 according to the first embodiment.

Figure 11:
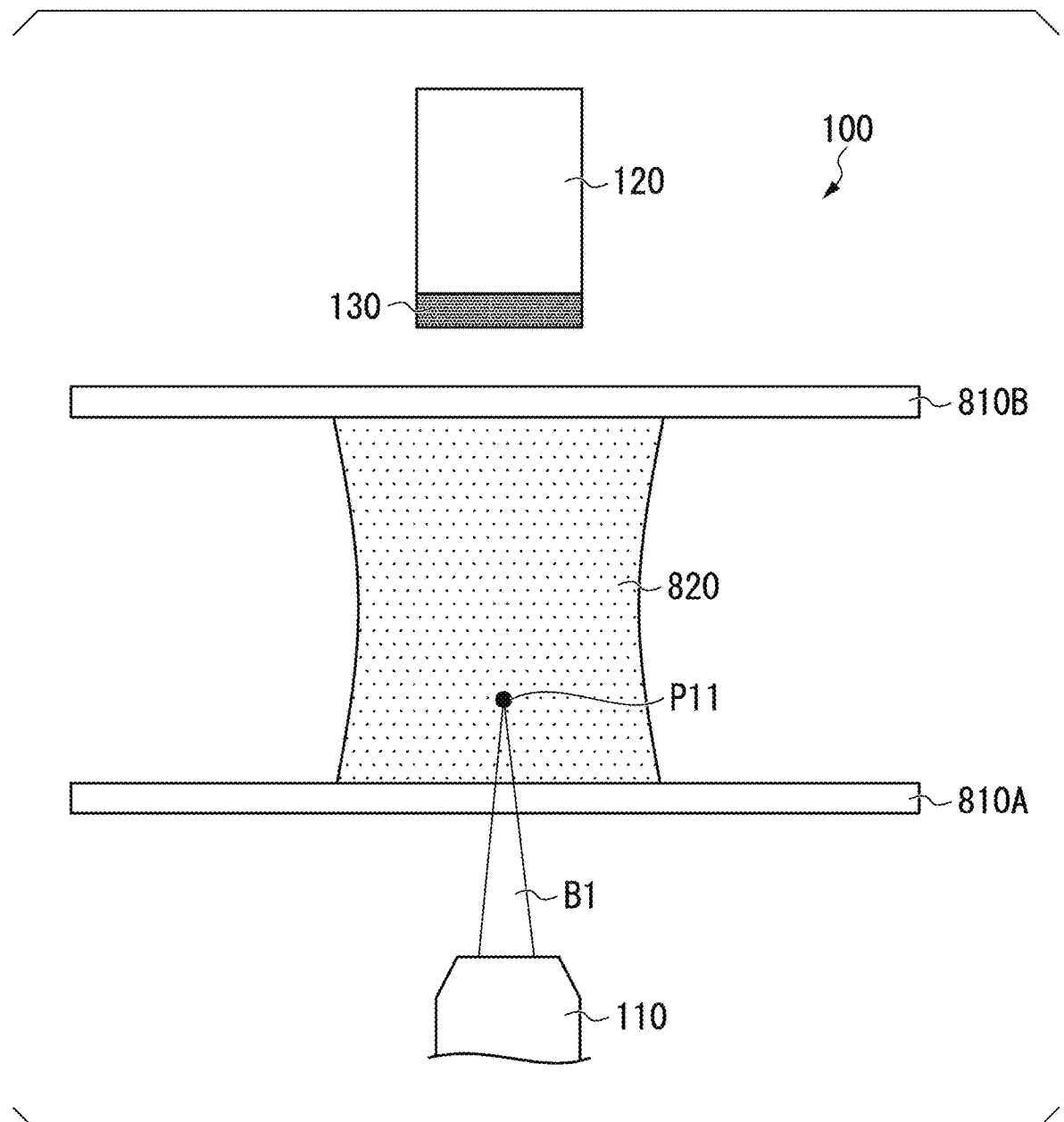
FIG. 11 is a diagram showing an example of a movement processing unit according to a second embodiment.

FIG. 11 is a diagram showing an example of the movement processing unit 120 according to the second embodiment. In the example shown in FIG. 11, the movement processing unit 120 includes a point heater 130 using electromagnetic waves. The point heater 130 heats the liquid column 820 using electromagnetic waves such as far infrared rays or laser light from a carbon gas laser. The heating of the point heater 130 creates a temperature gradient in the liquid column 820 and the liquid column 820 moves.

The point heater 130 irradiates a heating laser by which the liquid column 820 is surrounded in the horizontal direction. Thereby, the movement processing unit 120 creates a temperature gradient so that the temperature in the horizontal direction of the liquid column 820 is higher on the peripheral side than on the central side. The peripheral side mentioned here is a side closer to a boundary between the liquid column 820 and an external portion inside of the liquid column 820. The central side mentioned here is a side farther from the boundary between the liquid column 820 and the external portion inside of the liquid column 820.

This temperature gradient can prevent the liquid column 820 from spreading in the horizontal direction when the liquid column 820 is heated.

Hereinafter, when the positional relationship of the liquid column 820 in the horizontal direction will be described, the description that the liquid column 820 is in the horizontal direction may be omitted. For example, the circumference of the liquid column 820 in the horizontal direction is also simply referred to as the circumference of the liquid column 820. The peripheral side of the liquid column 820 in the horizontal direction is also simply referred to as the peripheral side of the liquid column 820. The central side of the liquid column 820 in the horizontal direction is also simply referred to as the central side of the liquid column 820. The spread of the liquid column 820 in the horizontal direction is also simply referred to as the spread of the liquid column 820.

Also, electromagnetic waves irradiated by the point heater 130 are also referred to as a heating beam.

Figure 12:
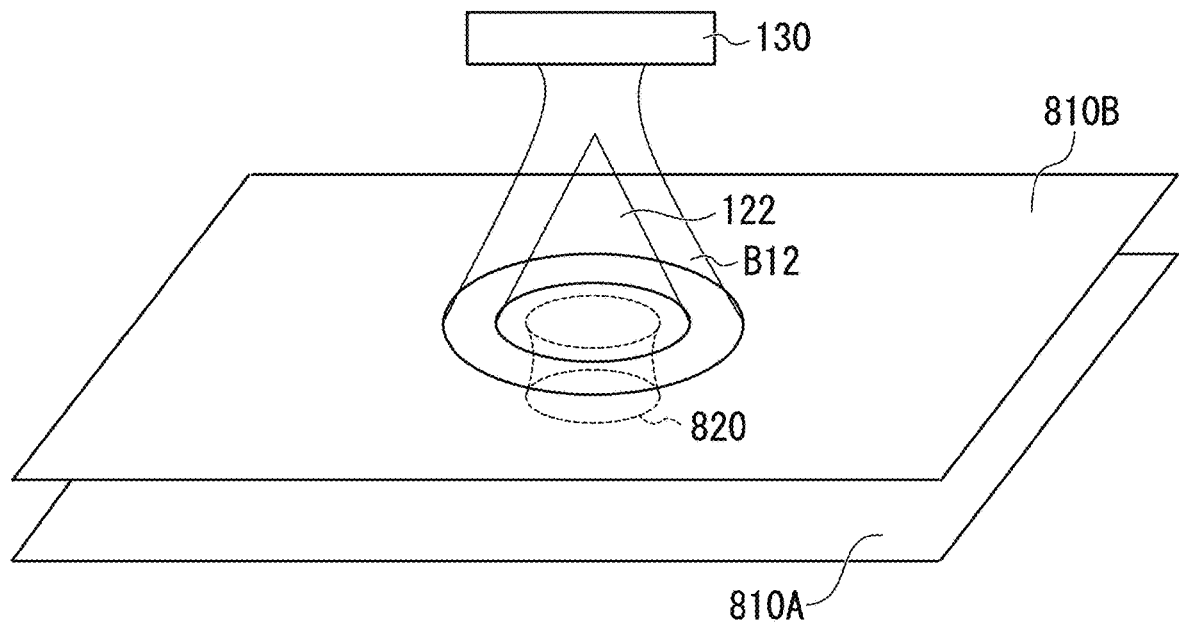
FIG. 12 is a diagram showing an example of a shape of a heating beam irradiated by the movement processing unit according to the second embodiment.

FIG. 12 is a diagram showing an example of a shape of the heating beam irradiated by the movement processing unit 120. In the example of FIG. 12, the liquid column 820 is located on the substrate 810A and the point heater 130 irradiates the heating beam B12 toward the liquid column 820.

However, the point heater 130 does not directly irradiate the heating beam B12 to the liquid column 820, but irradiates the heating beam B12 to the circumference of the liquid column 820. A cavity (a portion to which the heating beam B12 is not irradiated) is formed inside of the heating beam B12 and the liquid column 820 is located in a portion of the cavity. The cavity of the heating beam B12 is formed when a mask 122 blocks a part of the heating beam B12 irradiated by the point heater 130.

Even if the point heater 130 irradiates the heating beam B12 to the circumference of the liquid column 820 as in the example of FIG. 12, it is described that the point heater 130 irradiates the heating beam B12 to the liquid column 820.

Figure 13:
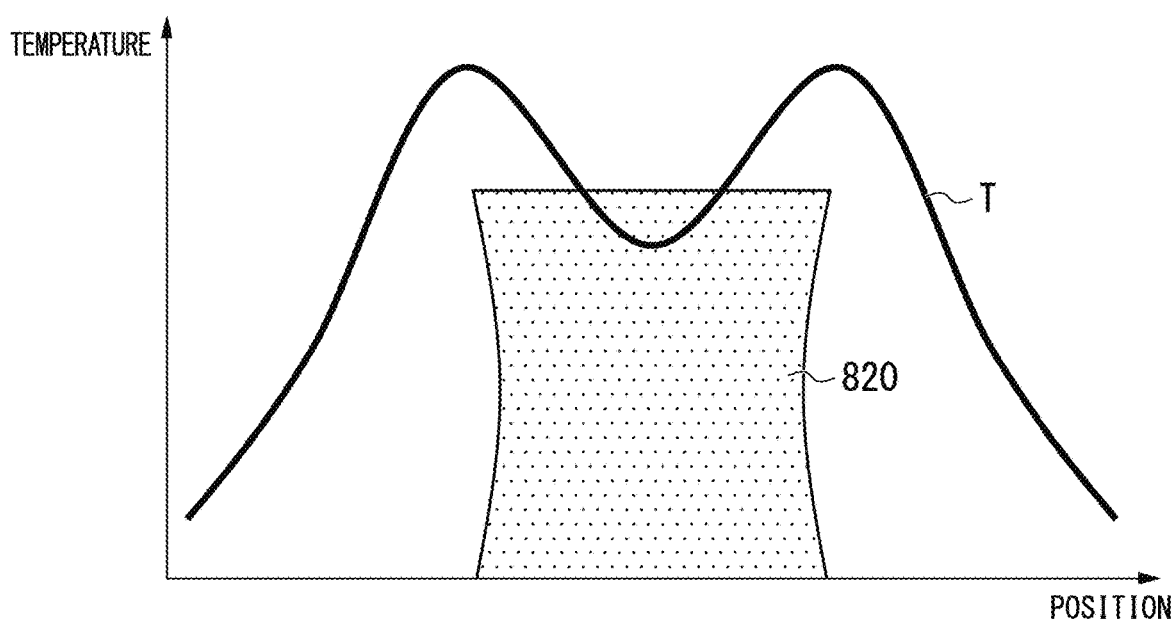
FIG. 13 is a diagram showing an example of a temperature gradient created by irradiating a heating beam according to the second embodiment.

FIG. 13 is a diagram showing an example of a temperature gradient created by irradiating the heating beam B12. FIG. 13 shows a temperature distribution of the liquid column 820 to which the heating beam B12 of the point heater 130 is irradiated as shown in FIG. 12.

The vertical axis of the graph in FIG. 13 represents a temperature. The horizontal axis represents a position in a horizontal direction in a virtual cross-section that vertically cuts the liquid column 820 through the vicinity of the center of the liquid column 820. A line T indicates a temperature distribution of the substrate 810B and the liquid column 820 in the cross-section. That is, the line T indicates a relationship between a position shown on the horizontal axis and temperatures of the substrate 810B and the liquid column 820.

Also, in FIG. 13, the position of the liquid column 820 is shown by illustrating the liquid column 820. As shown in FIG. 12, the point heater 130 irradiates the heating beam B12 to the circumference of the liquid column 820 and therefore a high-temperature gradient in which the temperature on the peripheral side of the liquid column 820 is higher than that on the central side is created as indicated by the line T.

The point heater 130 moves the heating beam B12 in a state in which the liquid column 820 is surrounded by the heating beam B12. Thereby, the point heater 130 moves the liquid column 820 while preventing the liquid column 820 from spreading. This point will be described with reference to FIGS. 14 and 15.

Figure 14:
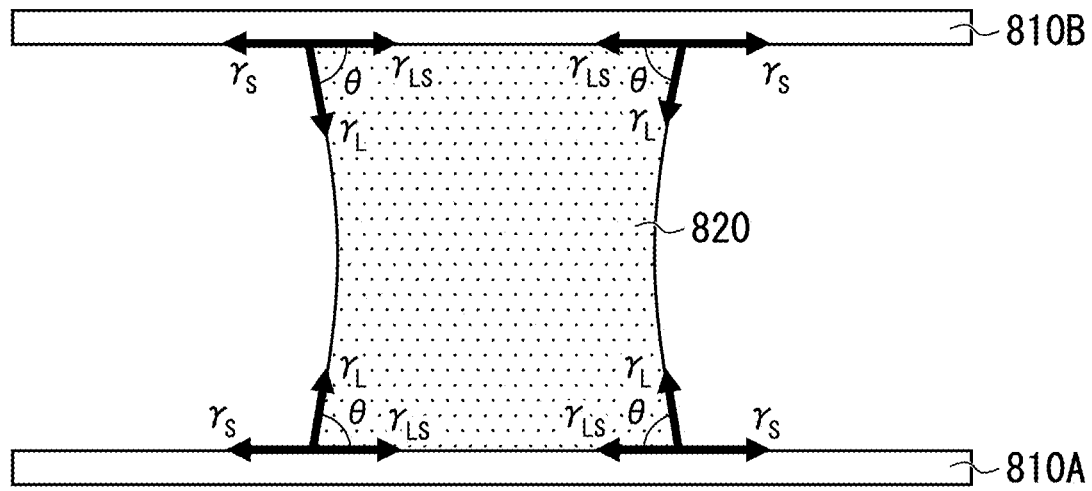
FIG. 14 is a diagram showing a first example of a force relationship in a liquid column according to the second embodiment.

FIG. 14 is a diagram showing a first example of a force relationship in the liquid column 820. FIG. 14 shows an example of a force relationship in the liquid column 820 in a normal temperature state of the liquid column 820 when the point heater 130 does not irradiate the heating beam B12 to the liquid column 820. In the example of FIG. 14, $\gamma_L$ denotes surface tension in the liquid column 820. $\gamma_S$ denotes surface tension of the solid (surface tension in the substrate 810). $\gamma_{LS}$ denotes solid-liquid interfacial tension. θ denotes a contact angle of the liquid column 820 with respect to the substrate 810.

In the case of FIG. 14, according to Young's equation, the forces within the liquid column 820 are balanced and the liquid column 820 does not move.

Also, even if the point heater 130 causes a temperature gradient to be created by irradiating the heating beam B12 by which the circumference of the liquid column 820 is surrounded and the heating beam B12 is not moved as in the example of FIG. 12, the forces in the liquid column 820 are balanced and the liquid column 820 does not move.

In this case, the temperature on the peripheral side of the liquid column 820 becomes higher than the temperature on the central side due to the irradiation of the heating beam B12. Thus, the surface tension on the central side of the liquid column 820 becomes larger than the surface tension on the peripheral side thereof and a force acts on the liquid column 820 in the direction in which the shape of the liquid column is maintained.

On the other hand, the irradiation of the heating beam B12 raises the overall temperature of the liquid column 820. Due to this temperature rise, the surface tension ($\gamma_L$ in FIG. 14) in the liquid column 820 becomes small, the contact angle (the angle θ) of the liquid column 820 with respect to the substrate 810 becomes small and a force acts in the direction in which the liquid column 820 spreads. A balance between a force for the liquid column 820 to spread due to the increase in the temperature of the liquid column 820 and a force for maintaining the shape of the liquid column 820 due to the increase in the surface tension on the central side of the liquid column 820 described above is maintained and therefore the liquid column 820 does not spread any further and stays.

Figure 15:
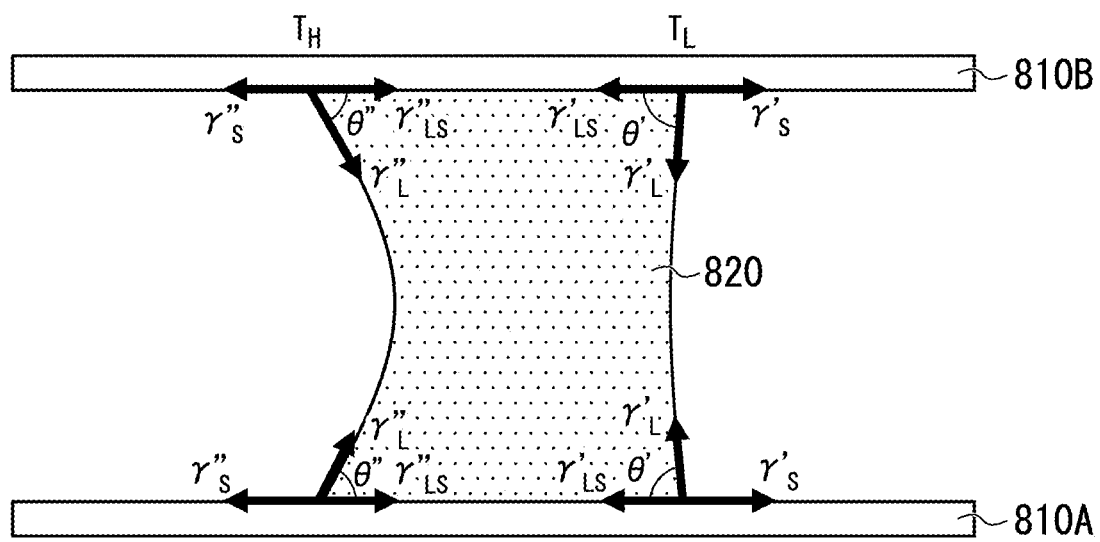
FIG. 15 is a diagram showing a second example of a force relationship in a liquid column according to the second embodiment.

FIG. 15 is a diagram showing a second example of the force relationship in the liquid column 820. FIG. 15 shows an example of the force relationship in the liquid column 820 when the point heater 130 moves the heating beam B12 and a temperature difference occurs at an end of the liquid column 820. FIG. 15 shows an example in which the point heater 130 moves the heating beam B12 to the right side in FIG. 15 and a temperature at an end of the liquid column 820 on the left side in FIG. 15 between ends of the liquid column 820 on the left and right sides becomes higher than that at the end of the liquid column 820 on the right side in FIG. 15.

The force on the side where the temperature is relatively low (on the right side in FIG. 15) is indicated by a variable name with ['] added to the variable name used in FIG. 14. Specifically, $\gamma'_L$ denotes the surface tension in the liquid column 820. $\gamma'_S$ denotes the surface tension of the solid (surface tension in the substrate 810). $\gamma'_{LS}$ denotes solid-liquid interfacial tension. θ' denotes the contact angle of the liquid column 820 with respect to the substrate 810.

On the other hand, a force on the side where the temperature is relatively high (on the left side in FIG. 15) is indicated by adding ["] to the variable name. Specifically, $\gamma''_L$ denotes the surface tension in the liquid column 820. $\gamma''_S$ denotes the surface tension of the solid (surface tension in the substrate 810). $\gamma''_{LS}$ denotes solid-liquid interfacial tension. θ" denotes a contact angle of the liquid column 820 with respect to the substrate 810.

In the example of FIG. 15, there is a temperature difference between the temperature $\gamma_H$ on the high-temperature side and the temperature $\gamma_L$ ($\gamma_H > \gamma_L$) on the low-temperature side. Due to this temperature difference, the contact angles and the surface tensions on the high-temperature side and the low-temperature side are changed from the case where the point heater 130 does not move the heating beam B12.

On the low-temperature side, the contact angle θ' is larger than that when the heating beam B12 is not moved and the number of horizontal components of the surface tension $\gamma'_L$ between the liquid and the gas is reduced.

That is, the balanced force changes in FIG. 14 and a force of the right direction in FIG. 15 (a direction from the high-temperature side end to the low-temperature side end of the liquid column 820) is generated in the same direction as the surface tension $\gamma'_S$ of the solid. On the other hand, on the high-temperature side, the contact angle θ" becomes smaller than that when the heating beam B12 is not moved and the number of horizontal components of the surface tension $\gamma''_L$ between the liquid and the gas increases. That is, the balanced force changes in FIG. 14 and the force of the right direction is generated in FIG. 15 in a direction opposite to the direction of the surface tension $\gamma''_S$ of the solid.

Because the forces generated on the low-temperature side and the high-temperature side are both facing right, a resultant force of both forces is also facing right. The liquid column 820 moves in a right direction (a direction in which the movement processing unit 120 moves the heating beam B12) in FIG. 15 using such a force as a driving force. Specifically, the liquid column 820 moves so that it is continuously located in the internal cavity of the heating beam B12 in accordance with the movement of the heating beam B12.

Although a method of performing a heating process so that the circumference of the liquid column 820 is surrounded by heat to create a temperature gradient has been described above, a mode in which the liquid column 820 is heated is not limited to a mode in which the circumference of the liquid column 820 is surrounded by heat. For example, the molding system 1 may be configured to create a temperature gradient in the liquid column 820 and move the liquid column 820 by heating any location of the substrate 810 or the liquid column 820 using a carbon gas laser.

Effects in Second Embodiment

The movement processing unit 120 of the molding device 100 according to the second embodiment moves the liquid column 820 by creating a temperature gradient in the liquid column 820 using the point heater 130 according to electromagnetic waves.

Thereby, the user of the molding device 100 can move the liquid column 820 using the laser of the point heater 130 according to electromagnetic waves.

Third Embodiment

Configuration of Molding System

Hereinafter, a third embodiment will be described. A control device 200 according to the third embodiment includes a substrate control unit 230 in addition to the configuration of the control device 200 according to the first embodiment. Thereby, the molding system 1 according to the third embodiment molds a solid object 840 by moving a substrate 810 upward and downward.

Figure 16:
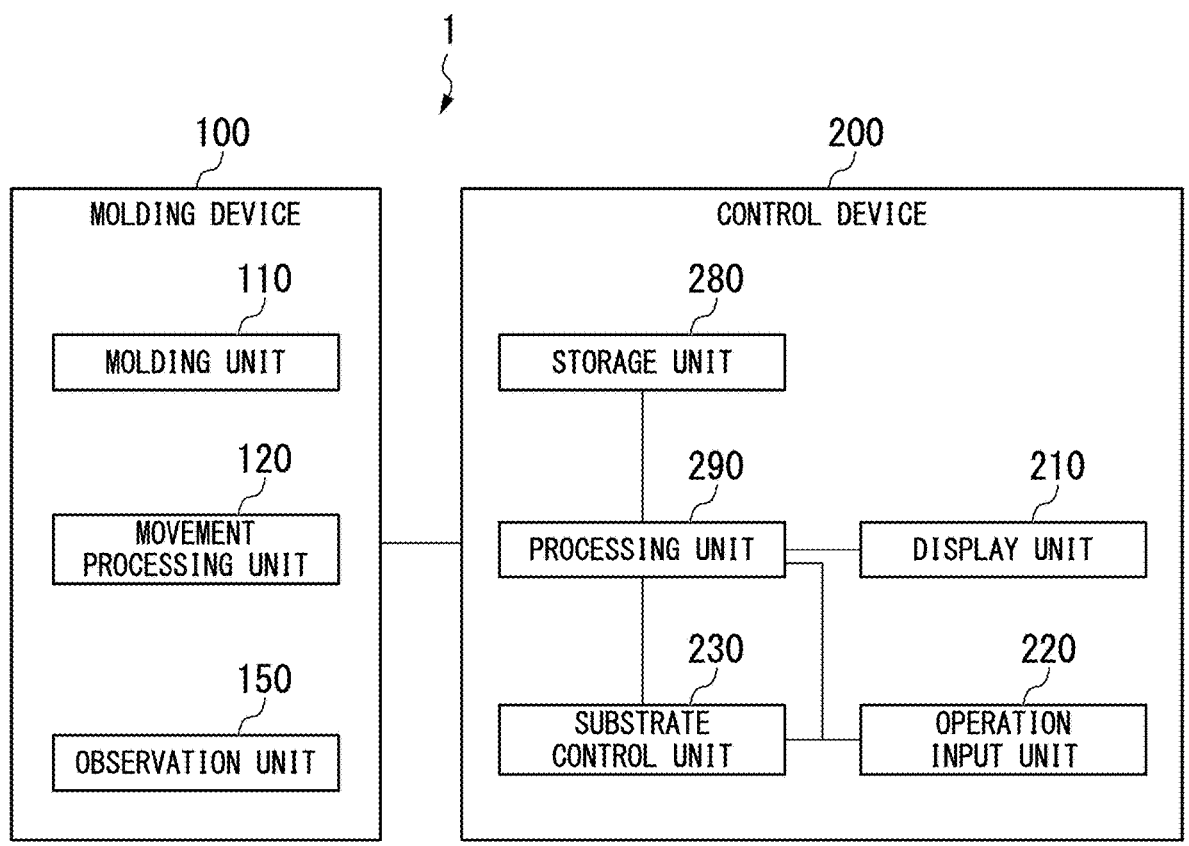
FIG. 16 is a diagram showing an example of a configuration of a molding system according to a third embodiment.

FIG. 16 is a schematic block diagram showing an example of a configuration of a molding system 1 according to the third embodiment. As described above, in the third embodiment, the control device 200 includes the substrate control unit 230. In relation to others, the molding system 1 according to the third embodiment is similar to the molding system 1 according to the first embodiment.

The substrate control unit 230 controls two substrates 810 so that they are separated from each other in a state in which a liquid column 820 is sandwiched between substrates 810 on the basis of an operation of a user received by, for example, an operation input unit 220, and performs a control process so that the two substrates 810 is closer to each other.

Figure 17:
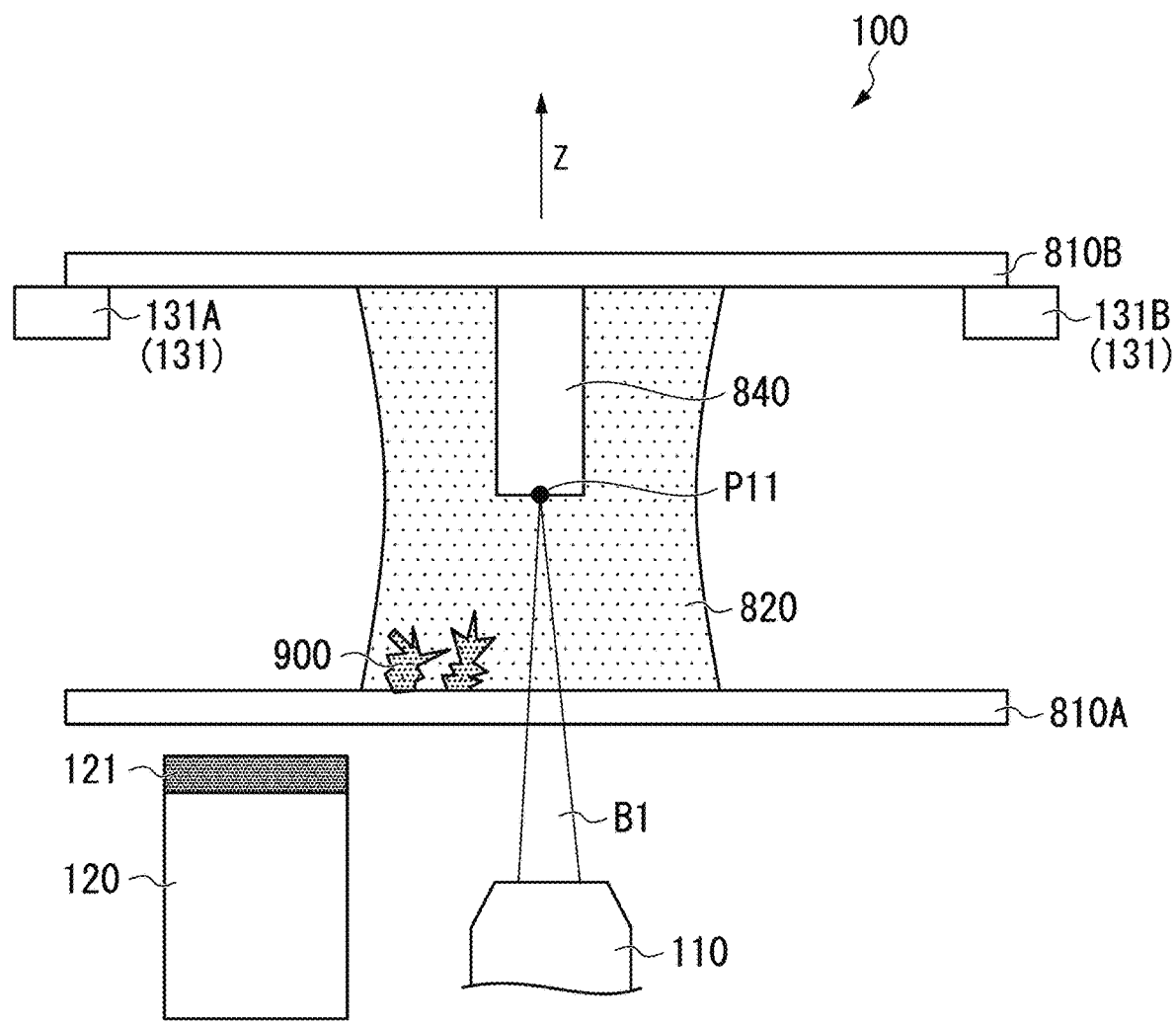
FIG. 17 is a diagram showing an example of a position of a focal point of laser light from a molding unit according to the third embodiment.

FIG. 17 is a diagram showing an example of a position of a focal point of laser light from a molding unit 110 according to the third embodiment. The molding system 1 according to the first embodiment molds the solid object 840 on a substrate 810A, whereas the molding system 1 according to the third embodiment molds the solid object 840 on an upper substrate 810B as shown in FIG. 17.

In the example of FIG. 17, the molding unit 110 irradiates a molding beam B1 from the side of the substrate 810A to the inside of the liquid column 820. In this case, a transparent material such as glass is used for the substrate 810A.

On the other hand, for the substrate 810B, an opaque material can be used when it is not necessary to transmit light. Examples of the opaque material include, but are not limited to, a ceramic substrate and a semiconductor substrate. As an example of the case where it is necessary to transmit light, there is a case where light from an observation light source 151 of an observation unit 150 is irradiated from the side of the substrate 810B described with reference to FIG. 5.

The same is true for the first embodiment and the second embodiment. In the second embodiment, it is only necessary to heat the surface of the substrate 810B on the side of the liquid column 820 with a heating beam B12 from a point heater 130 and the substrate 810B does not need to transmit the heating beam B12.

In particular, when the solid object 840 is attached to the substrate 810B as in the example of FIG. 17, there are various material options for the substrate 810B to be processed in that it is not necessary to transmit light, and the molding system 1 can be used for various purposes. For example, a semiconductor substrate can be disposed as the substrate 810B and processing such as partially applying a resin to the semiconductor substrate can be performed.

The substrate control unit 230 causes the substrate 810B to move in the vertical direction by sending an electrical signal to an actuator for the support base 131 attached to the substrate 810B. In the example of FIG. 17, the substrate control unit 230 causes a support base 131A and a support base 131B to move in a Z-direction and causes the substrate 810B to move in the Z-direction by sending an electrical signal indicating that the support base 131 moves in the Z-direction to the actuator for the support base 131A and the support base 131B. In FIG. 17, the Z-direction is an upward direction. Even in the example of FIG. 17, the substrate control unit 230 may be configured to cause the substrate 810B to move not only in the upward direction but also in a downward direction.

When the substrate 810B is moved in the upward/downward direction, a state in which the liquid column 820 comes into contact with the substrate 810B due to the viscosity of the substrate 810B and the liquid column 820 is maintained. Even if the substrate 810B is moved in the upward direction, the liquid column 820 remains in contact with the substrate 810B and the height of the liquid column 820 increases in the Z-direction.

Because a working distance of the molding beam B1 of the molding unit 110 is limited, the height of the solid object 840 that can be molded by the molding unit 110 is limited. The working distance of the molding beam B1 mentioned here is a distance from a reference position of the molding unit 110 such as a laser light-emitting portion of the molding unit 110 to a focal point of the molding beam B1.

However, in the case of the molding system 1 according to the third embodiment shown in FIG. 17, because a molding process can be performed while the substrate 810B moves in the Z-direction, the user of the molding system 1 can mold the solid object 840 having a height exceeding a limit of the working distance of the molding unit 110.

The method of performing the molding process while moving the substrate 810B in the upward direction is also referred to as a pulling method.

Effects in Third Embodiment

The molding device 100 according to the third embodiment includes the substrate control unit 230 configured to control the two substrates 810 so that the two substrates 810 are separated from each other in a state in which the liquid column 820 is sandwiched between the substrates 810.

Thereby, because the user of the molding system 1 can perform the molding process while moving the substrate 810B, it is possible to mold the solid object 840 having a height exceeding the limit due to the working distance of the molding unit 110.

The third embodiment may be applied to the second embodiment. Specifically, in the pulling method described in the third embodiment, a liquid column moving method according to ring heating of far infrared rays described in the second embodiment may be used. Even in this case, the solid object 840 can be molded in a processing procedure similar to that of the case where the third embodiment is applied to the first embodiment described above. When the third embodiment is applied to the second embodiment, the molding system 1 according to the third embodiment is similar to the molding system 1 according to the second embodiment, except that the control device 200 includes the substrate control unit 230.

Fourth Embodiment

Configuration of Molding System

A molding system 1 may handle a liquid in the form of droplets instead of the liquid column 820. In the fourth embodiment, this difference will be described.

Figure 18:
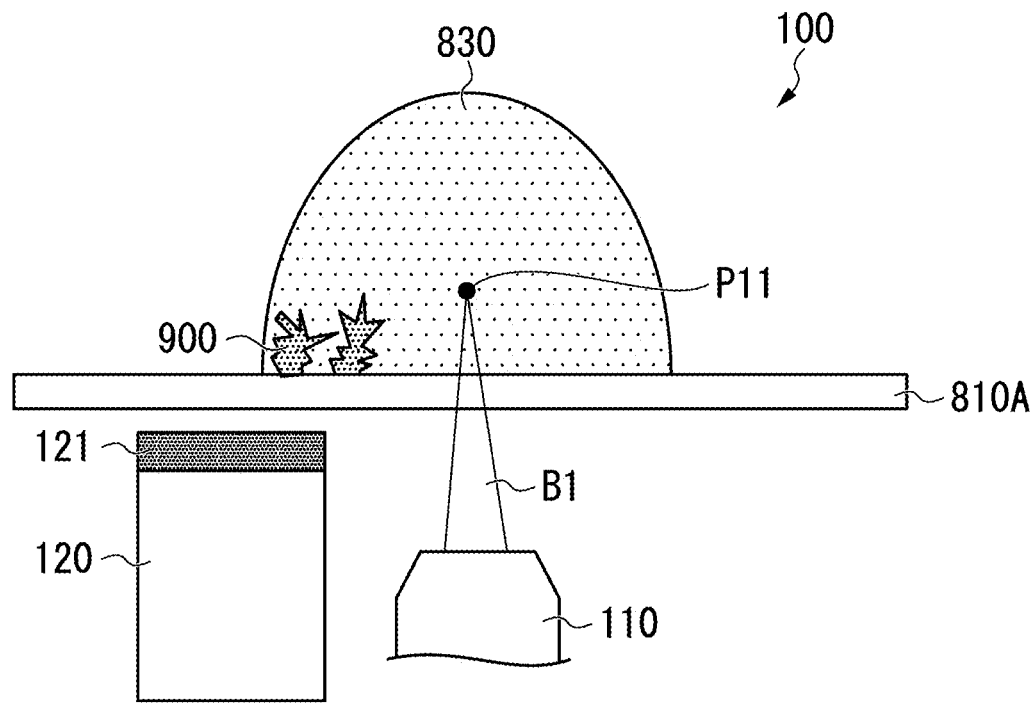
FIG. 18 is a diagram showing an example of a relationship between a substrate 810 and droplets according to a fourth embodiment.

FIG. 18 is a diagram showing an example of a relationship between a substrate 810 and droplets according to the fourth embodiment. In the example shown in FIG. 18, droplets 830 of a liquid material are located on a substrate 810A. The droplets mentioned here are a mass of liquid held together by surface tension.

The liquid material itself does not have magnetism and iron powder 900 is mixed into the liquid material. Due to the mixing of the iron powder 900, the droplets 830 have magnetism. Because the droplets 830 have magnetism, a movement processing unit 120 can move the droplets 830 by moving a magnetic substance 121.

Comparing the example of FIG. 18 with the example of FIG. 2, the substrate 810A on a lower side of a liquid column 820 and a substrate 810B on an upper side of the liquid column 820 are provided as the substrate 810 in FIG. 2. On the other hand, in FIG. 18, only the substrate 810A is provided as the substrate 810 and the substrate corresponding to the substrate 810B is not provided.

In relation to a position of the movement processing unit 120, in the example of FIG. 2, as described above, the movement processing unit 120 may be located below the substrate 810A or may be located above the substrate 810B. Even in the example of FIG. 18, the movement processing unit 120 may be located below the substrate 810A or may be located above the droplets 830. The term "above the droplets 830" is not limited to a case where the movement processing unit 120 is located directly above the droplets 830 and may be a case where the movement processing unit 120 is located diagonally above the droplets 830.

As described above, the fourth embodiment is different from the first embodiment in that only the substrate 810A is provided as the substrate 810, the substrate corresponding to the substrate 810B is not provided, and a liquid such as a material or a cleaning agent is formed as the droplets 830 instead of the liquid column 820.

In relation to others, the molding system 1 according to the fourth embodiment is similar to the molding system 1 according to the first embodiment.

In relation to a position of the molding unit 110, in the example of FIG. 18, the molding unit 110 irradiates the molding beam B1 from below the substrate 810 and therefore the molding beam B1 reaches the upper surface of the droplets 830 after a focal point of the molding beam B1 is formed. Therefore, a position where the focal point of the molding beam B1 is formed is not affected by the refraction according to the shape of the droplet 830 due to the surface tension. In this regard, the molding system 1 can align the focal point of the molding beam B1 with high accuracy.

However, the molding unit 110 may irradiate the molding beam B1 from above the droplets 830. Thereby, even in the case where the droplets 830 are located on an opaque object such as the case where the droplets 830 are dropped on the upper surface of the opaque substrate 810, it is possible to partially change a material to a solid by irradiating the molding beam B1 to the droplets 830.

Alternatively, as in the case of the third embodiment, the substrate 810B may be variably provided at a distance from the substrate 810A. For example, a support base 131 may support the substrate 810B as described with reference to FIG. 17. The substrate control unit 230 may be configured to cause the substrate 810B to move upward and downward by moving the support base 131 upward and downward.

When the substrate 810B is variably provided at a distance from the substrate 810A, the liquid can be formed as the liquid column 820 by setting the position of the substrate 810B to a position where the substrate 810B comes into contact with the liquid by the substrate control unit 230. Also, the substrate control unit 230 can form the liquid as the droplets 830 by increasing the distance between the substrate 810A and the substrate 810B so that the substrate 810B does not come into contact with the liquid.

Thereby, the molding system 1 can separately use the liquid column 820 and the droplets 830. For example, the liquid may be formed as the droplets 830 when the molding system 1 moves the liquid and the liquid may be formed as the liquid column 820 when a part of the liquid changes to a solid.

Effects in Fourth Embodiment

The molding device 100 according to the fourth embodiment includes the movement processing unit 120 configured to move the magnetic droplets 830 by moving the magnetic substance 121 and the molding unit 110 configured to perform a molding process by partially changing the droplets 830 to a solid within a prescribed molding region.

The molding device 100 can perform a movement process for the droplets 830. Thereby, the user of the molding device 100 can easily move the droplets 830 with a smaller position shift of a molded object, less disposal of resin, and less mixing of materials and can generate a solid object 840 using the droplets 830 cost-effectively.

Figure 19:
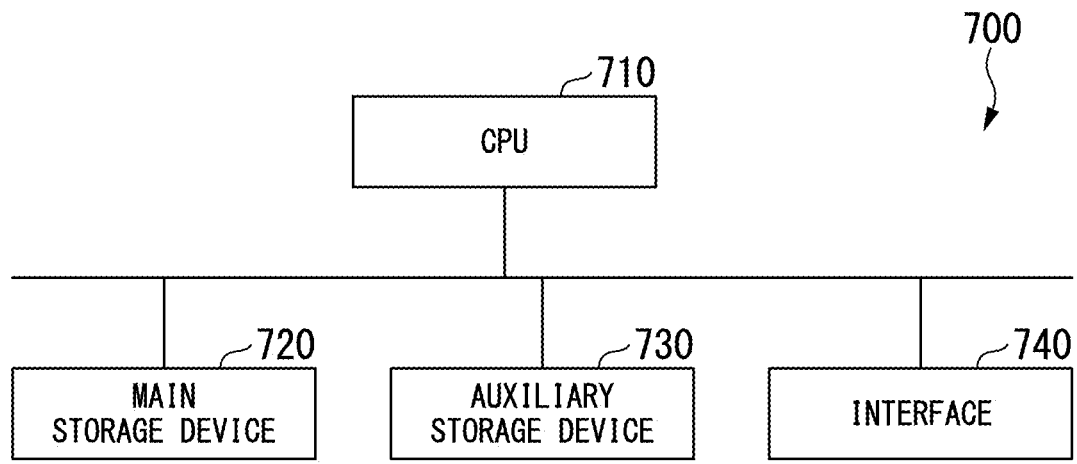
FIG. 19 is a schematic block diagram showing an example of a configuration of a computer according to at least one embodiment.

FIG. 19 is a schematic block diagram showing an example of a configuration of a computer according to at least one embodiment.

According to the configuration shown in FIG. 19, a computer 700 includes a central processing unit (CPU) 710, a main storage device 720, an auxiliary storage device 730, and an interface 740.

Any one or more of the molding device 100 and the control device 200 described above may be mounted in the computer 700. In this case, an operation of each of the above-described processing units is stored in the auxiliary storage device 730 in the form of a program. The CPU 710 reads the program from the auxiliary storage device 730, loads the program into the main storage device 720, and executes the above process in accordance with the program. Also, the CPU 710 secures a storage area corresponding to each of the above-described storage units in the main storage device 720 in accordance with the program.

When the molding device 100 is mounted in the computer 700, operations of the molding unit 110, the movement processing unit 120, and the observation unit 150 are stored in the auxiliary storage device 730 in the form of a program. The CPU 710 reads a program from the auxiliary storage device 730, loads the program into the main storage device 720, and executes the operation of each part in accordance with the program.

Also, the CPU 710 secures a storage area for a process to be performed by the molding device 100 in the main storage device 720 in accordance with the program. Communication between the molding device 100 and other devices is executed by the interface 740 having a communication function and operating in accordance with a control process of the CPU 710.

The interaction between the molding device 100 and the user is executed by the interface 740 having an input device and an output device, presenting information to the user on the output device in accordance with the control process of the CPU 710, and receiving the operation of the user on the input device.

When the control device 200 is mounted in the computer 700, the operation of the processing unit 290 is stored in the auxiliary storage device 730 in the form of a program. The CPU 710 reads a program from the auxiliary storage device 730, loads the program into the main storage device 720, and executes the operation of each part in accordance with the program.

As described above, the control device 200 may include a substrate control unit 230. When the substrate control unit 230 is mounted in the computer 700, the operation of the substrate control unit 230 is stored in the auxiliary storage device 730 in the form of a program. The CPU 710 reads a program from the auxiliary storage device 730, loads the program into the main storage device 720, and executes the operation of each part in accordance with the program.

Also, the CPU 710 secures a storage area for a process to be performed by the control device 200 in the main storage device 720 in accordance with the program. Communication between control device 200 and other devices is executed by the interface 740 having a communication function and operating in accordance with a control process of the CPU 710.

The interaction between the control device 200 and the user is executed by the interface 740 having an input device and an output device, presenting information to the user on the output device in accordance with the control process of the CPU 710, and receiving the operation of the user on the input device.

Also, a process of each part may be performed by recording a program for implementing some or all functions of processes to be performed by the molding device 100 and the control device 200 on a computer-readable storage medium and causing a computer system to read and execute the program recorded on the storage medium. The "computer system" mentioned here is assumed to include an operating system (OS) and hardware such as peripheral devices.

Also, the "computer-readable storage medium" refers to a storage device such as a flexible disc, a magneto-optical disc, a read-only memory (ROM), a portable medium of a compact disc-ROM (CD-ROM) or the like, or a hard disk embedded in the computer system. Also, the above-described program may be a program for implementing some of the above-described functions. Further, the above-described program may be a program capable of implementing the above-described function in combination with a program already recorded on the computer system.

Although embodiments of the present invention have been described above with reference to the drawings, specific configurations are not limited to the embodiments and other designs and the like may also be included without departing from the scope of the present invention.

INDUSTRIAL APPLICABILITY

Embodiments of the present invention may be applied to a molding device, a liquid column moving device, a molding method, a liquid column moving method, and a program.

REFERENCE SYMBOLS

1 Molding system
100 Molding device
110 Molding unit
120 Movement processing unit
121 Magnetic substance
122 Mask
130 Point heater
131 Support base
150 Observation unit
151 Observation light source
152 Beam splitter
153 Observation lens
154 CCD camera
155 Display device
200 Control device
210 Display unit
220 Operation input unit
230 Substrate control unit
280 Storage unit
290 Processing unit
810 Substrate
820 Liquid column
840 Solid object
900 Iron powder

The invention claimed is:

1. A molding device comprising:
   a movement processing unit configured to move a liquid column sandwiched between two substrates;
   a molding unit configured to perform a molding process so that a solid object is attached to the substrate farther from an irradiation hole of a molding beam by irradiating the molding beam so that a focal point of the molding beam is formed within a prescribed molding region in the liquid column, and by partially changing the liquid column to a solid; and
   a substrate control unit configured to control a movement of the substrates so that the substrate to which the solid object is attached separates from the irradiation hole of the molding beam when the molding unit performs the molding process.

2. The molding device according to claim 1, wherein magnetic particles are mixed into the liquid column.

3. The molding device according to claim 1, wherein the movement processing unit causes the liquid column to move by moving a magnet.

4. The molding device according to claim 1, wherein the movement processing unit causes the liquid column to move by creating a temperature gradient in the liquid column with a point heater using electromagnetic waves.

5. A molding method comprising:
   moving a liquid column sandwiched between two substrates;

performing a molding process so that a solid object being attached to the substrate farther from an irradiation hole of a molding beam by irradiating the molding beam so that a focal point of the molding beam is formed within a prescribed molding region in the liquid column, and by partially changing the liquid column to a solid; and controlling the movement of the substrates so that the substrate to which the solid object is attached separates from the irradiation hole of the molding beam when performing the molding process.

* * * * *